United States Patent
Yamamoto et al.

(10) Patent No.: US 12,022,467 B2
(45) Date of Patent: Jun. 25, 2024

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hongchao Li, Hessen (DE); Hidetoshi Suzuki, Kanagawa (JP); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 674 days.

(21) Appl. No.: 17/264,480

(22) PCT Filed: Mar. 25, 2019

(86) PCT No.: PCT/JP2019/012444
§ 371 (c)(1),
(2) Date: Jan. 29, 2021

(87) PCT Pub. No.: WO2020/026518
PCT Pub. Date: Feb. 6, 2020

(65) Prior Publication Data
US 2021/0227537 A1    Jul. 22, 2021

(30) Foreign Application Priority Data
Aug. 1, 2018  (JP) .................... 2018-144982

(51) Int. Cl.
*H04W 72/21*   (2023.01)
*H04W 72/0446*   (2023.01)

(52) U.S. Cl.
CPC ....... *H04W 72/21* (2023.01); *H04W 72/0446* (2013.01)

(58) Field of Classification Search
CPC . H04W 72/21; H04W 72/0446; H04W 72/56; H04W 28/04; H04L 5/0064;
(Continued)

(56) References Cited

U.S. PATENT DOCUMENTS

2014/0056278 A1* 2/2014 Marinier ............. H04W 72/044
370/330
2018/0279331 A1* 9/2018 Shaheen ............... H04W 72/23
(Continued)

FOREIGN PATENT DOCUMENTS

| EP | 3734922 A1 | 11/2020 |
| JP | 2012005034 A | 1/2012 |
| WO | WO 2018056786 A1 | 3/2018 |

OTHER PUBLICATIONS

Huawei, HiSilicon, "Resource allocation for PUCCH HARQ-ACK feedback," R1-1719398, Agenda Item: 7.3.2.4, 3GPP TSG RAN WG1 Meeting #91, Reno, USA, Nov. 27-Dec. 1, 2017. (5 pages).
(Continued)

*Primary Examiner* — Steven Hieu D Nguyen
(74) *Attorney, Agent, or Firm* — Seed IP Law Group LLP

(57) ABSTRACT

A terminal with which it is possible to appropriately transmit uplink control information. In a terminal (200), a control unit (211) determines a processing format for a response signal or for an uplink control channel used for transmission of the response signal, in accordance with request conditions for a response signal of downlink data. A transmission unit (216) uses the uplink control channel to transmit the response signal on the basis of the determined processing format.

16 Claims, 14 Drawing Sheets

(58) Field of Classification Search
CPC ..... H04L 1/0004; H04L 1/001; H04L 1/0016; H04L 1/1825; H04L 5/0053; H04L 5/0055; H04L 1/1854; H04L 1/0018
See application file for complete search history.

(56) References Cited

U.S. PATENT DOCUMENTS

| | | | | |
|---|---|---|---|---|
| 2018/0368173 | A1* | 12/2018 | Shaheen | H04W 72/23 |
| 2019/0007106 | A1 | 1/2019 | Park et al. | |
| 2019/0356446 | A1* | 11/2019 | Kim | H04L 5/0053 |
| 2020/0015250 | A1* | 1/2020 | Yang | H04L 5/001 |
| 2020/0404653 | A1* | 12/2020 | Matsumura | H04L 5/0055 |
| 2021/0022129 | A1* | 1/2021 | Yuan | H04L 5/0057 |
| 2021/0227503 | A1* | 7/2021 | Yoshioka | H04W 72/21 |
| 2021/0235482 | A1* | 7/2021 | Yoshioka | H04L 5/0055 |

OTHER PUBLICATIONS

OPPO, "Summary of offline discussion on PUCCH resource allocation," R1-1803428, Agenda Item: 7.1.3.2.4, E3GPP TSG RAN WG1 Meeting #92, Athens, Greece, Feb. 26-Mar. 2, 2018. (11 pages).
Panasonic, "Discussion on resource allocation for uplink control channel," R1-1718260, Agenda Item: 7.3.2.4, 3GPP TSG RAN WG1 Meeting #90bis, Prague, CZ, Oct. 9-13, 2017. (3 pages).
Panasonic, "Discussion on SR for URLLC and multiplexing with HARQ-ACK," R1-1710942, Agenda Item: 5.1.3.2.6, 3GPP TSG RAN WG1 NR Ad-Hoc#2, Qingdao, P.R. China, Jun. 27-30, 2017. (2 pages).
Spreadtrum Communications, "Considerations on PUCCH resource allocation for NR," R1-1717749, Agenda item: 7.3.2.4, 3GPP TSG RAN WG1 Meeting 90bis, Prague, CZ, Oct. 9-13, 2017. (4 pages).
Extended European Search Report, dated Sep. 21, 2021, for European Application No. 19844009.1-1215, 13 pages.
Fujitsu, "UCI multiplexing in short duration PUCCH," R1-1707257, Agenda Item: 7.1.3.2.4, 3GPP TSG RAN WG1 Meeting #89, Hangzhou, P.R. China, May 15-19, 2017, 3 pages.
Huawei, HiSilicon, "PUCCH reliability," R1-1804291, Agenda Item: 7.2.5, 3GPP TSG RAN WG1 Meeting #92bis, Sanya, China, Apr. 16-20, 2018, 4 pages.
3GPP TS 38.211 V15.2.0, "3$^{rd}$ Generation Partnership Project; Technical Specification Group Radio Access Network; NR; Physical channels and modulation (Release 15)," Jun. 2018, 96 pages.
3GPP TS 38.212 V15.2.0, "3$^{rd}$ Generation Partnership Project; Technical Specification Group Radio Access Network; NR; Multiplexing and channel coding (Release 15)," Jun. 2018, 98 pages.
3GPP TS 38.213 V15.2.0, "3$^{rd}$ Generation Partnership Project; Technical Specification Group Radio Access Network; NR; Physical layer procedures for control (Release 15)," Jun. 2018, 99 pages.
3GPP TS 38.214 V15.2.0, "3$^{rd}$ Generation Partnership Project; Technical Specification Group Radio Access Network; NR; Physical layer procedures for data (Release 15)," Jun. 2018, 95 pages.
Huawei, HiSilicon, "Discussion on UCI feedback for URLLC," R1-1717094, Agenda Item: 7.3.2.5, 3GPP TSG RAN WG1 Meeting #90bis, Prague, Czech Republic, Oct. 9-13, 2017, 5 pages.
Huawei, HiSilicon, "Discussion on UCI feedback for URLLC," R1-1800054, Agenda Item: 7.3.2.5, 3GPP TSG RAN WG1 Ad Hoc Meeting, Vancouver, Canada, Jan. 22-26, 2018, 13 pages.
International Search Report, mailed Apr. 23, 2019, for International Application No. PCT/2019/012444, 2 pages.
NTT DOCOMO, "Details on Resource Element Mapping," R1-1714598, Agenda Item: 6.1.2.1.1, 3GPP TSG RAN WG1 Meeting #90, Prague, Czech Republic, Aug. 21-25, 2017, 6 pages.
Qualcomm Incorporated, "Considerations for URLLC resource allocation for PUCCH," R1-1807362, Agenda item: 7.1.3.2.4, 3GPP Tsg Ran WG1 Meeting #93, Busan, South Korea, May 21-25, 2018, 3 pages.
Shariatmadari et al., "Control Channel Enhancements for Ultra-Reliable Low-Latency Communications," May 2017, 6 pages.
Vivo, "Discussion on eMBB and URLLC UCI multiplexing," R1-1806064, Agenda Item: 7.1.3.2.3, 3GPP TSG RAN WG1 Meeting #93, Busan, South Korea, May 21-25, 2018, 4 pages.
Yamamoto et al., "A Study on One-Symbol Uplink Control Channel for Release 16 NR URLLC," Sep. 2018, 6 pages. (With English Translation).
Communication pursuant to Article 94(3) EPC, dated Mar. 28, 2023, for corresponding European Patent Application No. 19 844 009.1-1215. (9 pages).
OPPO, "Summary of email discussion [90b-NR-29] on PUCCH resource set," R1-1719972, Agenda Item: 7.3.2.4, 3GPP TSG RAN WG1 Meeting 91, Reno, USA, Nov. 27-Dec. 1, 2017, 14 pages.
Vivo, "Discussion on short PUCCH for URLLC," R1-1806061, Agenda Item: 7.1.3.2.1, 3GPP TSG RAN WG1 Meeting #93, Busan, Korea, May 21-25, 2018, 4 pages.
English Translation of Chinese Search Report, dated Jan. 5, 2024, for Chinese Patent Application No. 2019800506616. (3 pages).

* cited by examiner

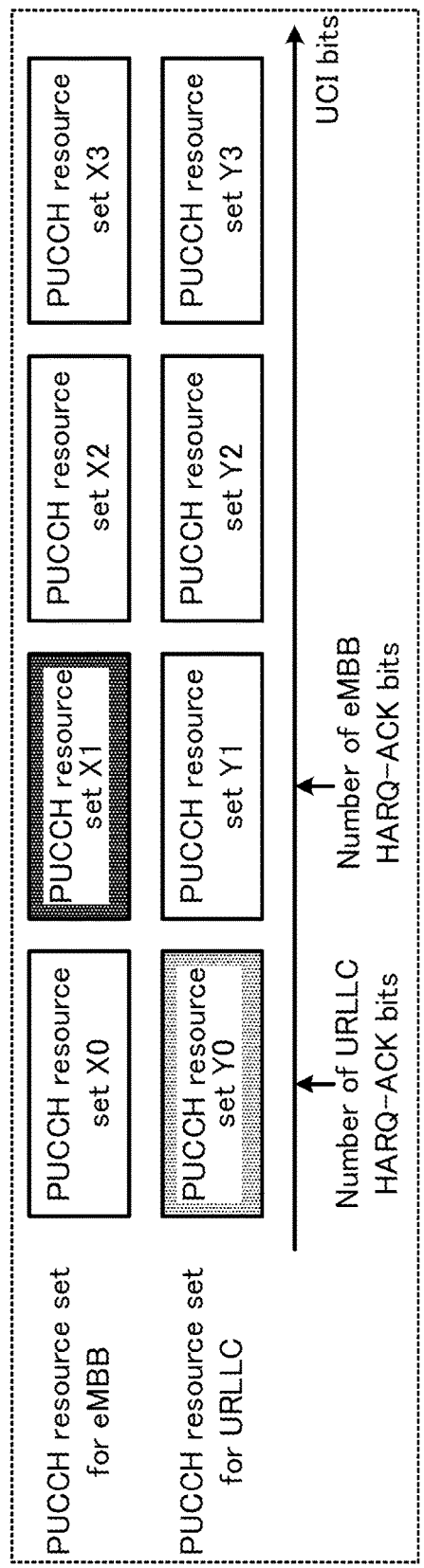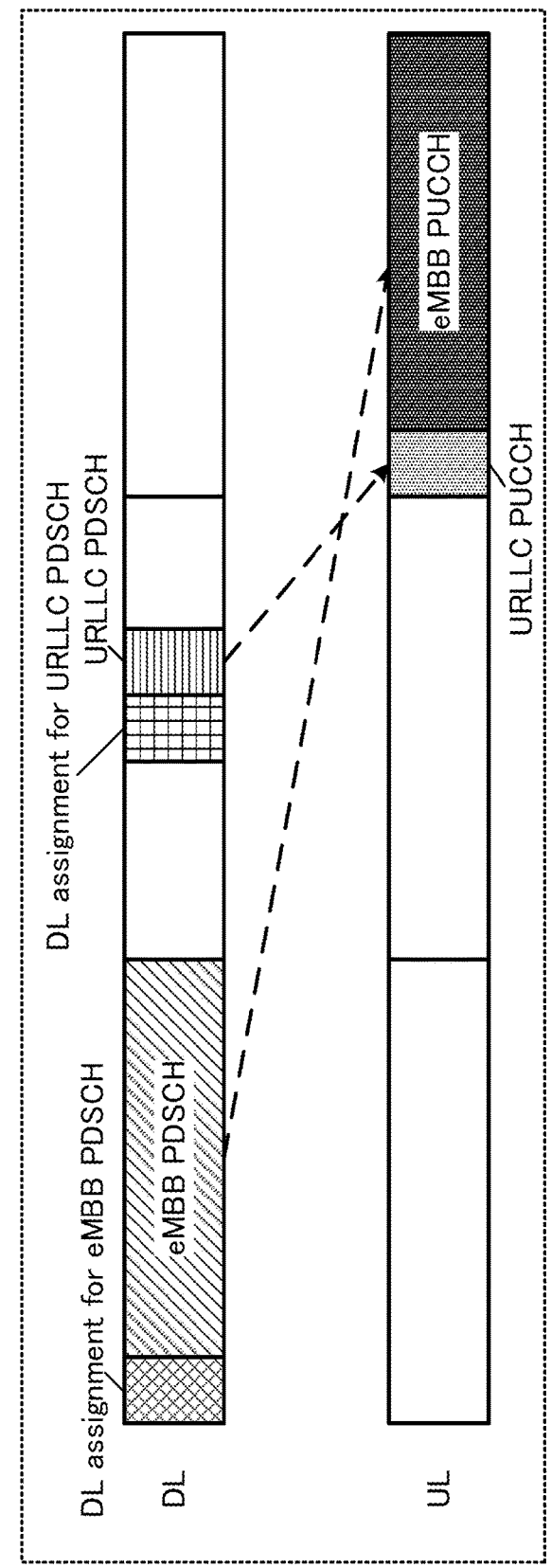
FIG. 10A
FIG. 10B

TERMINAL AND COMMUNICATION METHOD

TECHNICAL FIELD

The present disclosure relates to a terminal and a communication method.

BACKGROUND ART

The specification for designing Release 15 of New Radio access technology (NR) has been completed for implementing the 5th Generation mobile communication systems (5G) in the 3rd Generation Partnership Project (3GPP). NR supports Ultra Reliable and Low Latency Communication (URLLC) as well as high-speed and large capacity communication, which are basic requirements of enhanced Mobile Broadband (eMBB) (e.g., see Non-Patent Literatures (hereinafter, referred to as "NPL") 1 to 4).

The requirements for URLLC in Release 15 defined by 3GPP are to achieve user plane latency of 0.5 ms or less each way and to achieve latency of 1 ms or less with constant reliability.

Release 15 NR achieves the low latency by flexibly controlling subcarrier spacings or the number of transmission symbols, and shortening Transmit Time Intervals (TTIs). In addition, highly reliable data transmission is implemented by configuring or indicating Modulation and Coding Schemes (MCSs) or Channel Quality Indicators (CQIs) to achieve a low target Block Error Rate (BLER). For example, a target error rate (or a target BLER) may be configured for a normal mode (e.g., BLER=$10^{-1}$) or a high reliability mode (e.g., BLER=$10^{-5}$)

CITATION LIST

Non-Patent Literature

NPL 1

3GPP TS 38.211 V15.2.0, "NR; Physical channels and modulation (Release 15)," June 2018.

NPL 2

3GPP TS 38.212 V15.2.0, "NR; Multiplexing and channel coding (Release 15)," June 2018.

NPL 3

3GPP TS 38.213 V15.2.0, "NR; Physical layer procedure for control (Release 15)," June 2018.

NPL 4

3GPP TS 38.214 V15.2.0, "NR; Physical layer procedures for data (Release 15)," June 2018.

NPL 5

H. Shariatmadari, Z. Li, S. Iraji, M. A. Uusitalo, and R. Jantti, "Control channel enhancements for ultra-reliable low-latency communications," Proc. The 10th International Workshop on Evolutional Technologies and Ecosystems for 5G and Beyond (WDN-5G ICC2017), May 2017.

NPL 6

Presenters: Tetsuya YAMAMOTO, Ryoko KAWAUCHI, Yasuaki YUDA, and Hidetoshi SUZUKI, "Study on l-symbol uplink control channel for Release 16 NR URLLC", IEICE Society Conference 2018, September 2018.

SUMMARY OF INVENTION

Methods of transmitting uplink control information in NR have not been fully studied.

One non-limiting and exemplary embodiment facilitates providing a terminal, and a communication method each capable of appropriately transmitting uplink control information.

A terminal according to an embodiment of the present disclosure includes: circuitry, which, in operation, determines a processing mode for uplink control information or an uplink control channel to be used for transmission of the uplink control information, according to a requirement for the uplink control information; and a transmitter, which in operation, transmits the uplink control information using the uplink control channel based on the determined processing mode.

A communication method according to an embodiment of the present disclosure includes: determining a processing mode for uplink control information or an uplink control channel to be used for transmission of the uplink control information according to a requirement for the uplink control information; and transmitting the uplink control information using the uplink control channel based on the determined processing mode.

It should be noted that general or specific embodiments may be implemented as a system, an apparatus, a method, an integrated circuit, a computer program, a storage medium, or any selective combination thereof.

According to an embodiment of the present disclosure, it is possible to appropriately transmit uplink control information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 10A illustrates an exemplary transmission processing of ACK/NACK according to Option 1 of Embodiment 2;

FIG. 10B illustrates another exemplary transmission processing of ACK/NACK according to Option 1 of Embodiment 2;

DESCRIPTION OF EMBODIMENTS

Figure 1:
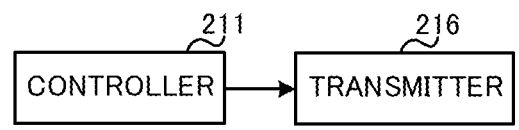
FIG. 1 is a block diagram illustrating a configuration of a part of a terminal according to Embodiment 1.

Hereinafter, detailed descriptions will be given of embodiments of the present disclosure with reference to the accompanying drawings.

Cell throughput or frequency utilization efficiency is required to be maximized in use cases of eMBB in Long-Term Evolution (LTE) or NR. In such a case, a target error rate of data is generally configured to be relatively high (e.g., BLER=$10^{-1}$) in the operation. This is because of the application of Hybrid Automatic Repeat Request (HARQ). For example, eMBB allows to eventually achieve highly reliable packet transmission (e.g., BLER=$10^{-5}$) taking into consideration of a combining gain of some retransmissions by HARQ.

URLLC, however, is required to achieve highly reliable packet transmission (e.g., BLER=$10^{-5}$) with delay of 1 ms or less. In the HARQ described above, for example, the occurrence of a data transmission error causes a retransmission request, and the data is retransmitted accordingly. The delay time increases as the number of retransmissions increases, and the requirement of low latency can no longer be met in this case. Thus, in URLLC, it is conceivable to operate so as to surely transmit the data in the first transmission by the above-described high reliability mode, i.e. the mode where the target error rate of the data is configured to be relatively low (e.g., BLER=$10^{-5}$), to achieve the highly reliable packet transmission without retransmissions by HARQ.

Although the configuration of a low target error rate leads to highly reliable data transmission, it requires more radio resources than the case of configuring a high target error rate. In Release 15 NR, the data size of URLLC is limited to 32 bytes, which is relatively small, and thus the configuration of the low target error rate does not cause so much influence on the resource utilization efficiency.

Release 16 or future URLLC, however, is expected to handle a larger data size than Release 15 NR and expand use cases of URLLC. In this case, the configuration of the low target error rate possibly needs a huge amount of radio resources to achieve the highly reliable packet transmission by a single transmission, and this is inefficient from the viewpoint of the resource utilization efficiency.

Thus, it is assumed to apply, for example, a high-speed HARQ retransmission control in the URLLC use cases handling a relatively large data size. The fast HARQ retransmission control is so operated that the high target error rate (e.g., BLER=$10^{-1}$ or BLER=$10^{-2}$) is configured for the first transmission and even when an error occurs in the first transmission, the data is surely transmitted in the retransmission following the first transmission (the second transmission), for example. As described above, the fast HARQ retransmission control is effective for performing the highly reliable packet transmission with low latency while improving the resource utilization efficiency.

Focusing on HARQ transmission in downlink here, a terminal (User Equipment (UE)) transmits a response signal indicating an error detection result of downlink data (Acknowledgement/Negative Acknowledgement (ACK/NACK), or also referred to as HARQ-ACK) to a base station (e.g., eNB or gNB).

At this time, the required reliability or the latency requirement for the response signal transmission differs in accordance with the reliability, the latency requirement or the type of use cases/services (or usage scenarios) of the downlink data transmission.

Assuming the operation in URLLC that when an error occurs in the first transmission, the data can be surely transmitted in the next transmission (the retransmission), for example, the higher the target error rate of the first data transmission is, the higher reliability is required for the transmission of the response signal, i.e. the response signal transmission with a lower target error rate is required. For example, when the target error rate of the first data transmission is BLER=$10^{-1}$, the required error rate for the response signal is BLER=$10^{-4}$ or less, and when the target error rate of the first data transmission is BLER=$10^{-3}$, the required error rate for the response signal is BLER=$10^{-2}$ or less (see, for example, NPL 5).

Incidentally, comparing eMBB and URLLC, lower latency is required for the response signal to the URLLC data transmission than the response signal to the eMBB data transmission.

In Release 15 NR, however, studies have not been fully carried out on the operations related to response signals with different reliability, latency requirements, or types of use cases (or services) in a feedback mechanism for the response signals from a terminal.

Further, the terminal transmits response signals to a base station using a Physical Uplink Control Channel (PUCCH). In Release 15 NR, however, PUCCH to achieve the reliability requirement (e.g., the error rate of BLER=$10^{-4}$ or less) for the response signal transmission in URLLC that allows retransmission has not been designed.

In addition, a terminal in NR is assumed to support a plurality of use cases or services (e.g., eMBB and URLLC). The terminal in NR is also assumed to support a plurality of data transmissions with different target error rates in URLLC. In this situation, the terminal possibly simultaneously transmits the response signals corresponding to the respective data transmissions with different reliability, latency requirements, or types of use cases (or services) in the same uplink slot.

In Release 15 NR, the number of PUCCHs that can transmit the response signals in a single slot is limited to one. Thus, the response signals are transmitted by being multiplexed in a single PUCCH if the response signals to the respective data transmissions with different reliability, latency requirements, or types of use cases (or services) are simultaneously transmitted in the same uplink slot as described above.

In a method in Release 15 NR, for example, when response signals with different required reliability are multiplexed, it is assumed to configure a radio resource for PUCCH according to the reliability of a response signal requiring high reliability in order to meet the requirement for the response signal requiring the high reliability. In this case, however, the radio resource for PUCCH for a response signal requiring lower reliability than the response signal requiring the high reliability (i.e., the response signal for which high reliability is not required) is configured similarly to the case of the response signal requiring the high reliability, and thus it is inefficient from the viewpoint of the resource utilization efficiency.

Further, when response signals with different required reliability are multiplexed, the response signals are arranged in a HARQ-ACK codebook (a response signal bit string) for multiplexing the response signals in order from the response signal corresponding to downlink data received earlier in time, regardless of the reliability, latency requirements, or types of use cases (or services). For example, when response signals with different latency requirements (e.g., the response signals corresponding to eMBB and URLLC) are transmitted by being multiplexed to a single PUCCH, the transmission of the response signal not requiring low latency (e.g., the response signal to eMBB) becomes a bottleneck for latency in some cases.

In this regard, an embodiment of the present disclosure will describe transmission methods for response signals with different reliability, latency requirements, or types of use cases (or services). In other words, descriptions will be given of transmission methods for response signals according to "requirements" such as reliability, latency requirements, or types of use cases (or services).

Hereinafter, each embodiment will be described in detail.

Embodiment 1

[Overview of Communication System]

The communication system according to each embodiment of the present disclosure includes base station 100 and terminal 200.

FIG. 1 is a block diagram illustrating a configuration of a part of terminal 200 according to each embodiment of the present disclosure. In terminal 200 illustrated in FIG. 1, controller 211 determines a processing mode (e.g., a transmission method or a parameter configuration) for uplink control information (UCI; e.g., a response signal to downlink data) or an uplink control channel (e.g., PUCCH) to be used for transmission of the uplink control information according to a requirement (e.g., reliability, a latency requirement, or a type of use cases/services) for the uplink control information. Transmitter 216 transmits the uplink control information using the uplink control channel based on the determined processing mode.

[Configuration of Base Station]

Figure 2:
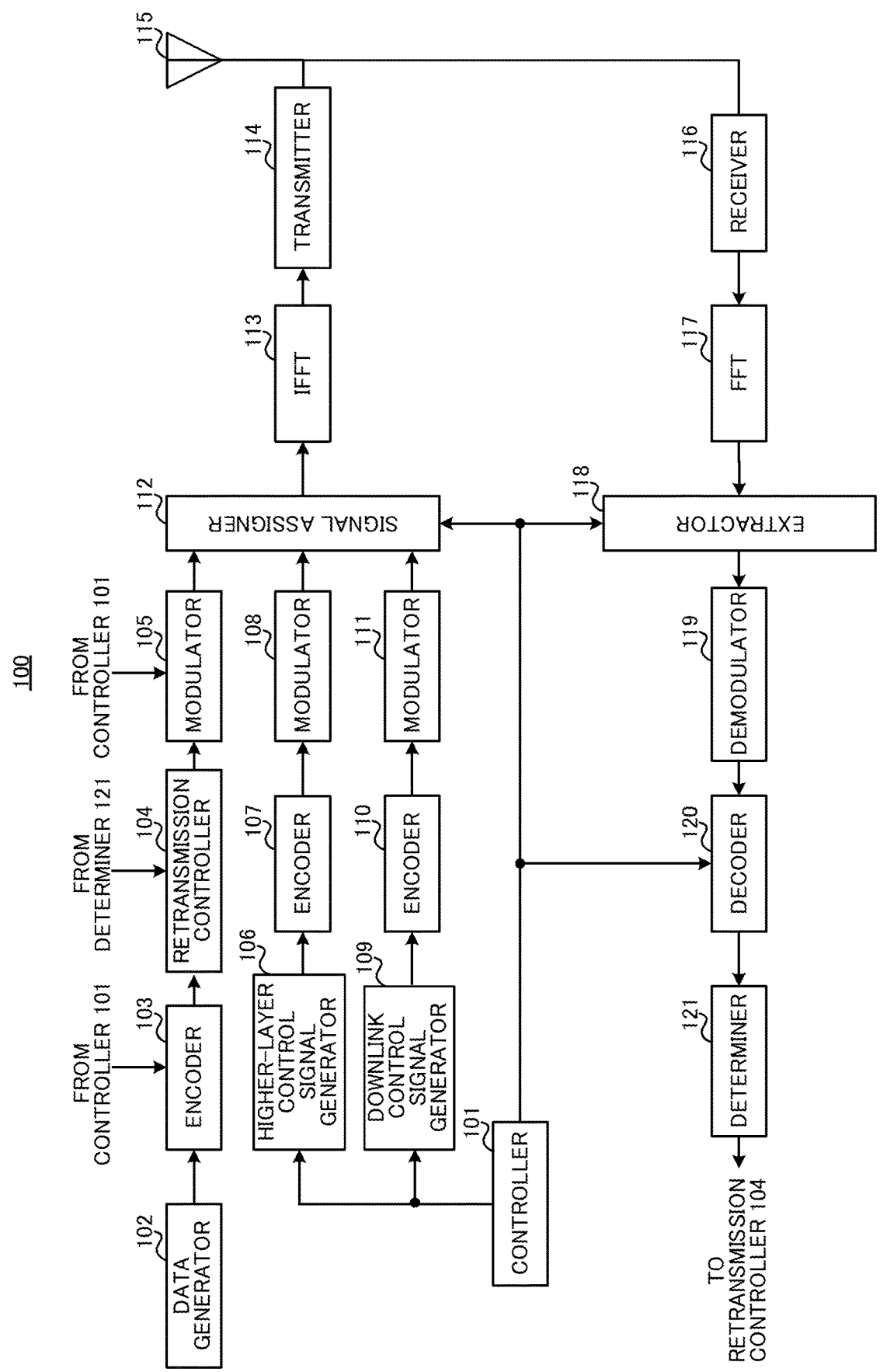
FIG. 2 is a block diagram illustrating a configuration of a base station according to Embodiment 1.

FIG. 2 is a block diagram illustrating a configuration of base station 100 according to Embodiment 1 of the present disclosure. In FIG. 2, base station 100 includes controller 101, data generator 102, encoder 103, retransmission controller 104, modulator 105, higher-layer control signal generator 106, encoder 107, modulator 108, downlink control signal generator 109, encoder 110, modulator 111, signal assigner 112, Inverse Fast Fourier Transformer (hereinafter, referred to as "IFFT") 113, transmitter 114, antenna 115, receiver 116, Fast Fourier Transformer (hereinafter, referred to as "FFT") 117, extractor 118, demodulator 119, decoder 120, and determiner 121.

Controller 101 determines information on downlink data transmission for terminal 200, and outputs the determined information to encoder 103, modulator 105, and signal assigner 112. The information on downlink data transmission includes, for example, a coding and modulation scheme (e.g., MCS) for the downlink data to be transmitted in PDSCH, a radio resource for PDSCH (hereinafter, referred to as a "PDSCH resource"), or the like. Controller 101 also outputs the determined information to downlink control signal generator 109.

In addition, controller 101 determines information on reliability, a latency requirement, or a type of use cases (or services) of downlink data for terminal 200 (i.e., information on a requirement for a response signal), and outputs the determined information to higher-layer control signal generator 106 or downlink control signal generator 109. The information is indicated to terminal 200 (e.g., controller 211).

Further, controller 101 also determines information on transmission of uplink control information (UCI) of terminal 200, and outputs the determined information to extractor 118 and decoder 120. Controller 101 also outputs the information on the transmission of UCI to higher-layer control signal generator 106 or downlink control signal generator 109. The information on the transmission of UCI includes, for example, a transmission method or a parameter for UCI (e.g., a response signal or CSI) or PUCCH to be used for the transmission of UCI.

The information to be outputted to higher-layer control signal generator 106 includes, for example, information on a PUCCH resource set, information on a set of slot positions (e.g., PDSCH-to-HARQ-ACK timings) to be semi-statically configured, information on a maximum coding rate of UCI, or the like. Meanwhile, the information to be outputted to downlink control signal generator 109 includes, for example, information for indicating a radio resource to be actually used for PUCCH (hereinafter, referred to as a PUCCH resource) in the PUCCH resource set, information for indicating a PDSCH-to-HARQ-ACK timing to be actually used in the set of slot positions to be semi-statically configured, and the like.

In addition, controller 101 determines the radio resource allocation for a higher-layer control signal or a downlink control signal for transmitting downlink control information, and the radio resource allocation for downlink data. Controller 101 outputs the determined information to signal assigner 112.

Data generator 102 generates the downlink data for terminal 200, and outputs the data to encoder 103.

Encoder 103 applies error correction encoding to the downlink data to be inputted from data generator 102 based on the information to be inputted from controller 101 (e.g., the information on the coding rate), and outputs the data signal after encoding to retransmission controller 104.

Retransmission controller 104 holds the encoded data signal to be inputted from encoder 103 in the first transmission, and also outputs the signal to modulator 105. Further, when NACK to the transmitted data signal is inputted from determiner 121, which will be described later, retransmission controller 104 outputs the corresponding holding data to modulator 105. When ACK to the transmitted data signal is inputted from determiner 121, in contrast, retransmission controller 104 deletes the corresponding holding data.

Modulator 105 modulates the data signal to be inputted from retransmission controller 104 based on the information to be inputted from controller 101 (e.g., the information on the modulation scheme), and outputs the data modulated signal to signal assigner 112.

Higher-layer control signal generator 106 generates a control information bit string (a higher-layer control signal) using the control information to be inputted from controller 101, and outputs the generated control information bit string to encoder 107.

Encoder 107 applies error correction encoding to the control information bit string to be inputted from higher-layer control signal generator 106 and outputs the control signal after encoding to modulator 108.

Modulator 108 modulates the control signal to be inputted from encoder 107, and outputs the control signal after the modulation to signal assigner 112.

Downlink control signal generator 109 generates a control information bit string (a downlink control signal; e.g., DCI) using the control information to be inputted from controller 101, and outputs the generated control information bit string to encoder 110. The control information is transmitted to a plurality of terminals in some cases, and thus downlink control signal generator 109 may generate the bit string including a terminal ID of each terminal in the control information for each terminal. Note that a scrambling sequence, which will be described later, may be used for the terminal ID.

Encoder 110 applies error correction encoding to the control information bit string to be inputted from downlink control signal generator 109, and outputs the control signal after encoding to modulator 111.

Modulator 111 modulates the control signal to be inputted from encoder 110, and outputs the control signal after the modulation to signal assigner 112.

Signal assigner 112 maps the data signal to be inputted from modulator 105, the higher-layer control signal to be inputted from modulator 108, or the downlink control signal to be inputted from modulator 111 to a radio resource based on the information indicating the radio resource to be inputted from controller 101. Signal assigner 112 outputs the downlink signal including the mapped signal to IFFT 113.

IFFT 113 applies transmission waveform generation processing such as OFDM to the signal to be inputted from signal assigner 112. IFFT 113 adds a Cyclic Prefix (CP) in the case of OFDM transmission adding a CP (not illustrated). IFFT 113 outputs the generated transmission waveform to transmitter 114.

Transmitter 114 applies Radio Frequency (RF) processing such as Digital-to-Analog (D/A) conversion and up-conversion to the signal to be inputted from IFFT 113, and transmits the radio signal to terminal 200 via antenna 115.

Receiver 116 applies RF processing such as down-conversion or Analog-to-Digital (A/D) conversion to an uplink signal waveform received from terminal 200 via antenna 115, and outputs the uplink signal waveform after the reception processing to FFT 117.

FFT 117 applies FFT processing for converting a time-domain signal into a frequency-domain signal to the uplink signal waveform to be inputted from receiver 116. FFT 117 outputs the frequency-domain signal obtained by the FFT processing to extractor 118.

Extractor 118 extracts a radio resource component on which PUCCH has been transmitted from the signal to be inputted from FFT 117 based on the information to be inputted from controller 101 (e.g., the information on the transmission of UCI). Extractor 118 outputs the extracted radio resource component to demodulator 119.

Demodulator 119 equalizes and demodulates the radio resource component corresponding to PUCCH to be inputted from extractor 118, and outputs the demodulation result (the demodulation sequence) to decoder 120.

Decoder 120 performs error correction decoding on the demodulation result to be inputted from demodulator 119 based on the information on the transmission of UCI to be inputted from controller 101 (e.g., the information on encoding of UCI), and outputs the bit sequence after decoding to determiner 121.

Determiner 121 determines whether the response signal transmitted from terminal 200 indicates ACK (without error) or NACK (with error) to the transmitted data signal based on the bit sequence to be inputted from decoder 120. Determiner 121 outputs the determination result to retransmission controller 104.

[Configuration of Terminal]

Figure 3:
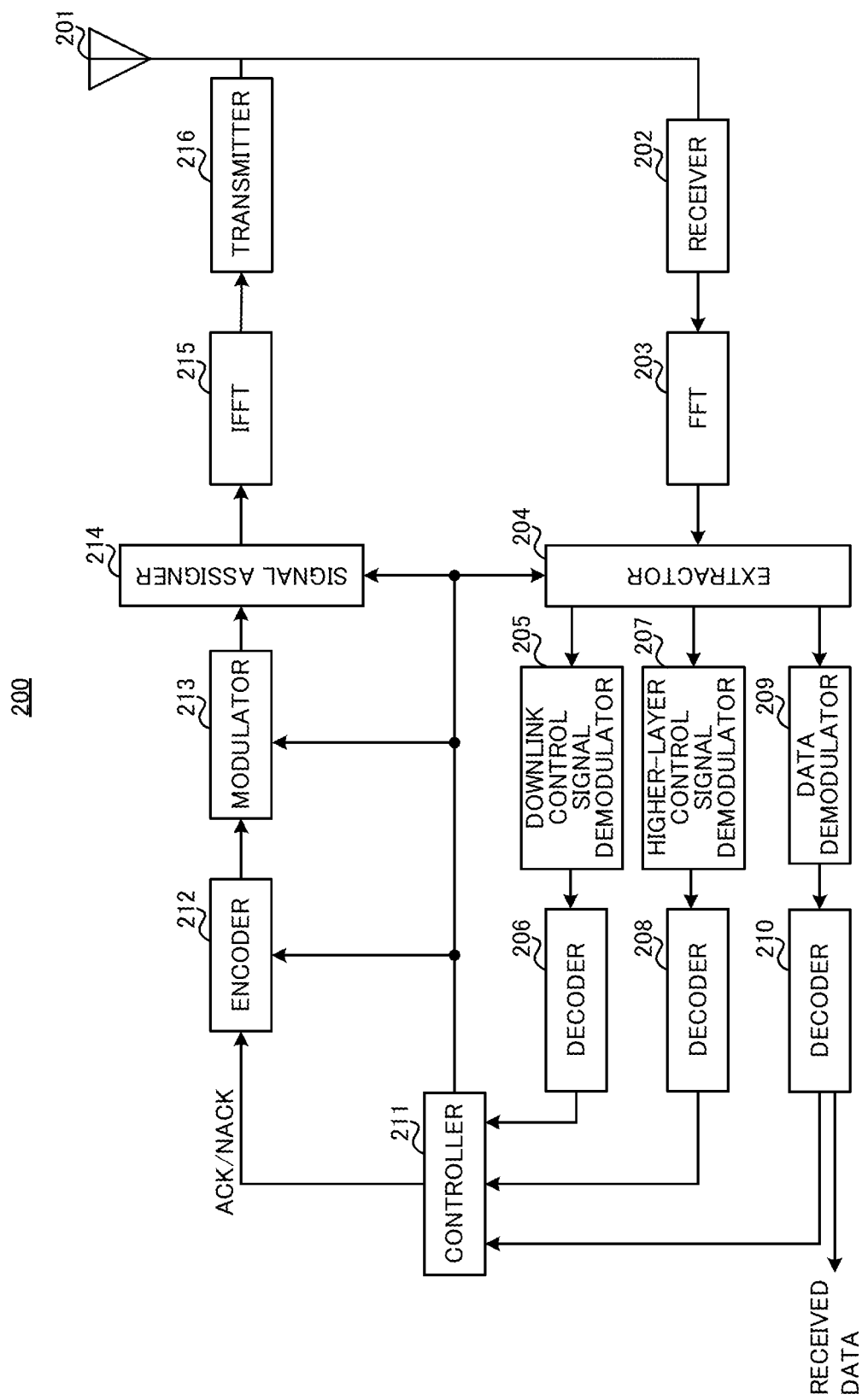
FIG. 3 is a block diagram illustrating a configuration of the terminal according to Embodiment 1.

FIG. 3 is a block diagram illustrating a configuration of terminal 200 according to Embodiment 1 of the present disclosure. In FIG. 3, terminal 200 includes antenna 201, receiver 202, FFT 203, extractor 204, downlink control signal demodulator 205, decoder 206, higher-layer control signal demodulator 207, decoder 208, data demodulator 209, decoder 210, controller 211, encoder 212, modulator 213, signal assigner 214, IFFT 215, and transmitter 216.

Receiver 202 applies RF processing such as down-conversion or Analog-to-Digital (A/D) conversion to a signal waveform of a downlink signal (a data signal or a control signal) received from base station 100 via antenna 201, and outputs the received signal (i.e., a baseband signal) obtained by the RF processing to FFT 203.

FFT 203 applies FFT processing for converting a time-domain signal into a frequency-domain signal to the signal (the time-domain signal) to be inputted from receiver 202. FFT 203 outputs the frequency-domain signal obtained by the FFT processing to extractor 204.

Extractor 204 extracts a downlink control signal (e.g., DCI), a higher-layer control signal, or downlink data from the signal to be inputted from FFT 203 based on the control information to be inputted from controller 211 (e.g., information on a radio resource for the downlink data or the control signal). Extractor 204 outputs the downlink control signal to downlink control signal demodulator 205, the higher-layer control signal to higher-layer control signal demodulator 205, and the downlink data to data demodulator 209.

Downlink control signal demodulator 205 equalizes and demodulates the downlink control signal to be inputted from extractor 204, and outputs the demodulation result to decoder 206.

Decoder 206 applies error correction decoding using the demodulation result to be inputted from downlink control signal demodulator 205, and obtains control information. Decoder 206 then outputs the obtained control information to controller 211.

Higher-layer control signal demodulator 207 equalizes and demodulates the higher-layer control signal to be inputted from extractor 204, and outputs the demodulation result to decoder 208.

Decoder 208 applies error correction decoding using the demodulation result to be inputted from higher-layer control signal demodulator 207, and obtains control information. Decoder 208 then outputs the obtained control information to controller 211.

Data demodulator 209 equalizes and demodulates the downlink data to be inputted from extractor 204, and outputs the demodulation result to decoder 210.

Decoder 210 applies error correction decoding using the demodulation result to be inputted from data demodulator 209. Decoder 210 also applies error detection to the downlink data, and outputs the error detection result to controller 211. In addition, decoder 210 outputs the downlink data determined to have no errors as a result of the error detection, as received data.

Controller 211 determines a transmission method or a parameter (e.g., MCS or a radio resource) for UCI (e.g., ACK/NACK or CSI) or PUCCH to be used for the transmission of UCI, based on the information on the transmission of UCI of terminal 200 included in the control information to be inputted from decoder 206 or decoder 208. Controller 211 outputs the determined information to encoder 212, modulator 213, and signal assigner 214.

Further, controller 211 generates a response signal (ACK/NACK) using the error detection result to be inputted from decoder 210, and outputs the signal to encoder 212.

Furthermore, controller 211 outputs the information on the radio resource for the downlink data or the control signal included in the control information to be inputted from decoder 206 or decoder 208, to extractor 204.

Encoder 212 applies error correction encoding to the response signal (a bit sequence of ACK/NACK) based on the information to be inputted from controller 211, and outputs the response signal (the bit sequence) after encoding to modulator 213. Encoder 212, for example, may generate the encoded bit string by applying different encoding methods for response signals with different requirements such as reliability, latency requirements, or types of use cases (or services), as described later.

Modulator 213 modulates the response signal to be inputted from encoder 212 based on the information to be inputted from controller 211, and outputs the response signal (a modulation symbol string) after the modulation to signal assigner 214. When different encoding methods are applied to the encoded bit strings inputted from encoder 212, for example, modulator 213 performs the modulation on each encoded bit string.

Signal assigner 214 maps the response signal (the modulation symbol string) to be inputted from modulator 213 to the radio resource for PUCCH to be indicated by controller 211. Signal assigner 214 then outputs the signal including the mapped response signal to IFFT 215.

IFFT 215 applies transmission waveform generation processing such as OFDM to the signal to be inputted from signal assigner 214. IFFT 215 adds a Cyclic Prefix (CP) in the case of OFDM transmission adding a CP (not illustrated). Alternatively, a Discrete Fourier Transformer (DFT) may be added in a preceding stage of signal assigner 214 when IFFT 215 generates a single-carrier waveform (not illustrated). IFFT 215 outputs the generated transmission waveform to transmitter 216.

Transmitter 216 applies Radio Frequency (RF) processing such as Digital-to-Analog (D/A) conversion and up-conversion to the signal to be inputted from IFFT 215, and transmits the radio signal to base station 100 via antenna 201.

[Operations of Base Station 100 and Terminal 200]

Operations of base station 100 and terminal 200 that include above-mentioned configurations will be described in detail.

Figure 4:
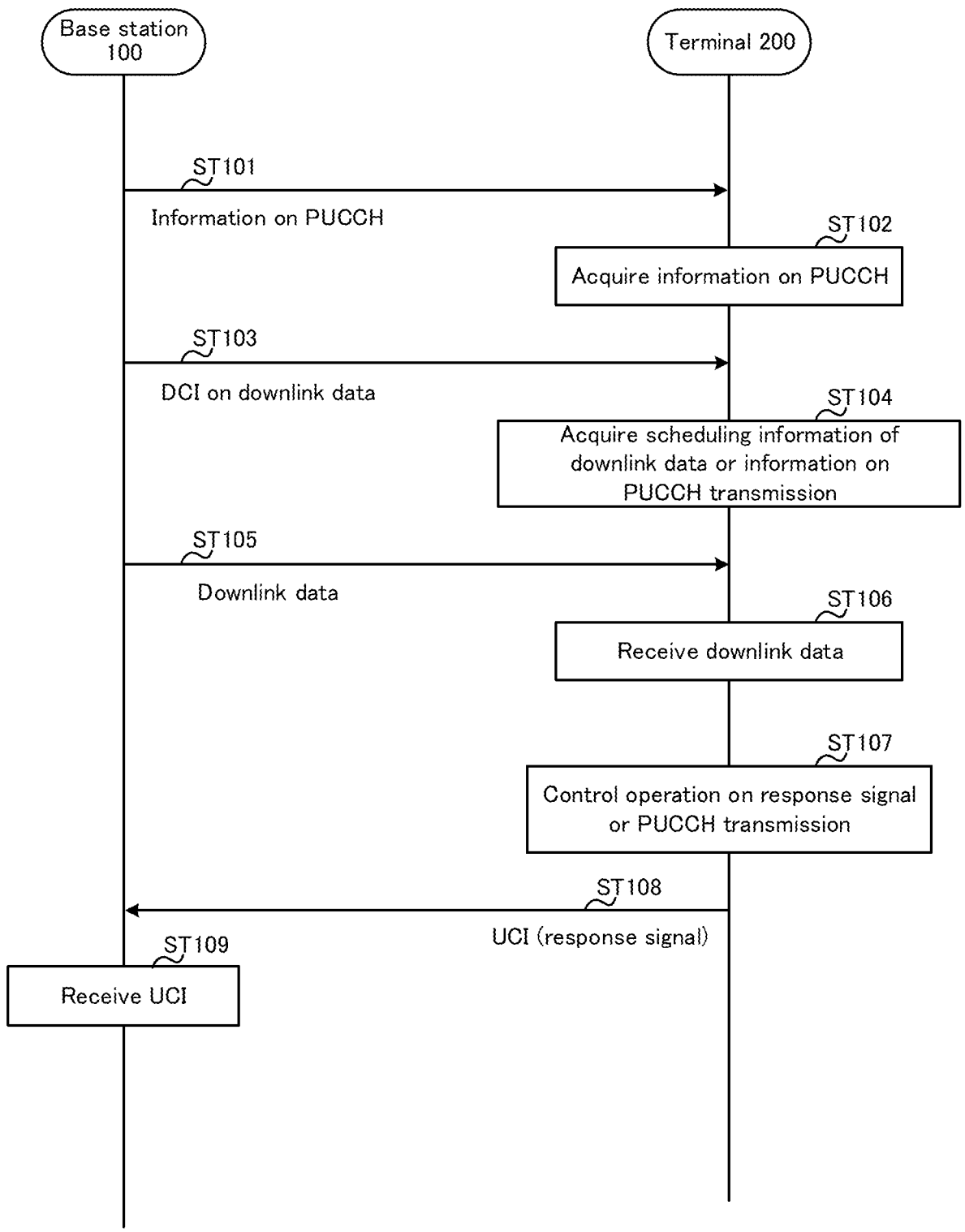
FIG. 4 is a sequence diagram illustrating processing in the base station and the terminal according to Embodiment 1.

FIG. 4 illustrates the processing in base station 100 and terminal 200 according to the present embodiment.

Base station 100 transmits information on PUCCH to terminal 200 (ST101). Terminal 200 acquires the information on PUCCH indicated from base station 100 (ST102). The information on PUCCH includes, for example, information on a PUCCH resource set or information on an coding rate of PUCCH.

Base station 100 transmits DCI including information on downlink data to terminal 200 (ST103). Terminal 200 acquires scheduling information for the downlink data or the information on PUCCH, for example, based on the DCI to be indicated from base station 100 (ST104).

Base station 100 transmits the downlink data to terminal 200 (ST105). Terminal 200 receives the downlink data (PDSCH) based on the DCI that has been indicated from base station 100, for example (ST106).

Terminal 200 controls the operation related to a response signal or the transmission of the response signal according to a requirement (i.e., reliability, a latency requirement, or a type of use cases/services) for the response signal (ST107). Terminal 200, for example, determines a processing mode for the response signal or PUCCH according to the requirement for the response signal. In the determination of the processing mode for the response signal or PUCCH, an encoding method for the response signal, a determination method for the PUCCH resource, or a parameter related to the PUCCH transmission may be determined, for example.

Terminal 200 transmits UCI (including the response signal, for example) to base station 100 using PUCCH based on the determined operation (ST108). Base station 100 receives the UCI to be transmitted from terminal 200 (ST109).

Next, control methods of the operation related to the UCI transmission (e.g., a process in ST107 in FIG. 4) in terminal 200 will be described in detail.

[Encoding Method]

Terminal 200 generates HARQ-ACK bits by respectively applying different encoding methods for response signals with different reliability, latency requirements, or types of use cases (or services), i.e., response signals with different requirements.

Terminal 200 then multiplexes the encoded response signals to which the different encoding methods have been applied to PUCCH, and transmits the signals.

For example, terminal 200 respectively applies encoding processes with different coding rates for the response signals with different reliability, latency requirements, or types of use cases (or services).

For example, terminal 200 encodes the response signal requiring high reliability using a low coding rate (e.g., a coding rate equal to or less than a threshold), and generates a HARQ-ACK bit. The application of the low coding rate improves the reliability of the response signal.

In contrast, terminal 200 encodes the response signal not requiring high reliability using a high coding rate (e.g., a coding rate greater than a threshold), and generates a HARQ-ACK bit. The application of the high coding rate prevents the number of bits of the response signal from increasing, and improves the resource utilization efficiency.

The case where the reliability of the response signals is different from each other will be described as an example of causing a difference in encoding processes for the response signals. For example, in URLLC, the encoding process to be applied may be different between the response signal to downlink data with a high target error rate in the first data transmission (e.g., BLER=$10^{-1}$) and the response signal to downlink data with a low target error rate in the first data transmission (e.g., BLER=$10^{-5}$).

To be more specific, when the target error rate of the first data transmission is high, high reliability is required for the response signal so that the data is surely retransmitted, and thus the encoding method with a low coding rate is applied to the response signal. When the target error rate of the first data transmission is low, in contrast, errors in the data are less likely to occur and not very high reliability is required for the response signal. Thus, the encoding method with a high coding rate is applied to the response signal.

Other examples of causing a difference in the encoding processes for the response signals are the case where latency requirements of the response signals are different from each other, or the case where types of use cases (or services) of the response signals are different from each other (e.g., URLLC or eMBB).

Figure 5:
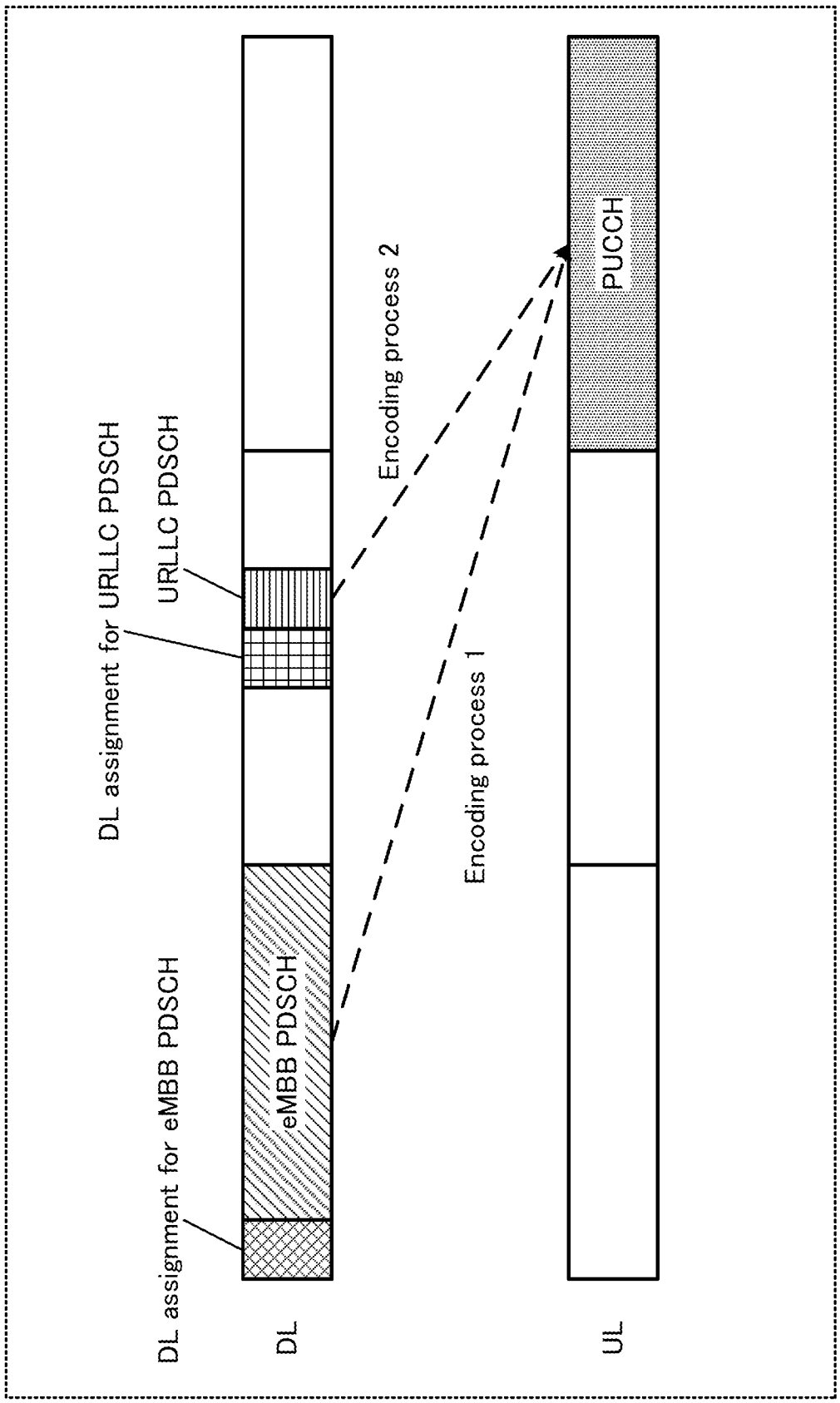
FIG. 5 illustrates an exemplary transmission processing of ACK/NACK according to Embodiment 1.

FIG. 5 illustrates an example in which different encoding methods (encoding processes) are applied to the response signals for URLLC and eMBB. In FIG. 5, terminal 200 applies encoding process 1 to the response signal to downlink data of eMBB (eMBB PDSCH), and applies encoding process 2 to the response signal to downlink data of URLLC (URLLC PDSCH).

For example, URLLC requires high reliability, and the encoding method with a low coding rate is thus applied in encoding process 2 for the response signal. Meanwhile, eMBB does not require high reliability compared with URLLC, and the encoding method with a high coding rate is thus applied in encoding process 1 for the response signal.

In FIG. 5, terminal 200 generates a HARQ-ACK bit for each of the response signals for URLLC and eMBB by respectively applying different encoding methods. Terminal 200 then multiplexes the generated HARQ-ACK bits to a single PUCCH, and transmits the resultant bits to base station 100.

As described above, the present embodiment enables terminal 200 to apply an appropriate encoding method (e.g., a coding rate) for each response signal according to the reliability, the latency requirement, or the type of use cases (or services) of the response signal. This makes it possible for each response signal to be encoded using the encoding method according to the requirement for each response signal even when the requirements of the response signals to be multiplexed to a single PUCCH are different from each other, thereby achieving the efficient PUCCH transmission from the viewpoint of the resource utilization efficiency.

Note that the application of different encoding processes for each ACK/NACK is not limited to be determined based on the reliability or the type of use cases (services) described above, and may be determined based on at least one of the reliability, the latency requirement, or the type of use cases (services), for example.

[Mapping Method]

Next, descriptions will be given of mapping methods for the response signals with different reliability, latency requirements, or types of use cases (or services), i.e., response signals with different requirements, to a PUCCH resource.

For example, terminal 200 maps the response signals to PUCCH in order from the one requiring higher reliability, or the one requiring lower latency for the latency requirement. To be more specific, terminal 200 first maps the response signal requiring higher reliability or lower latency to the PUCCH resource. Terminal 200 then maps the response signal not requiring high reliability or low latency to the PUCCH resource.

Hereinafter, descriptions will be given as examples of mapping methods for the response signals in a Short-PUCCH (e.g., PUCCH Format 2) composed of one or two symbols and a Long-PUCCH (e.g., PUCCH Format 3 or PUCCH Format 4) composed of four or more symbols.

<Case of Short PUCCH>

The following two methods (Option 1 and Option 2) may be applied to the mapping of the response signals to the PUCCH resource in the Short PUCCH.

[Option 1]

Figure 6:
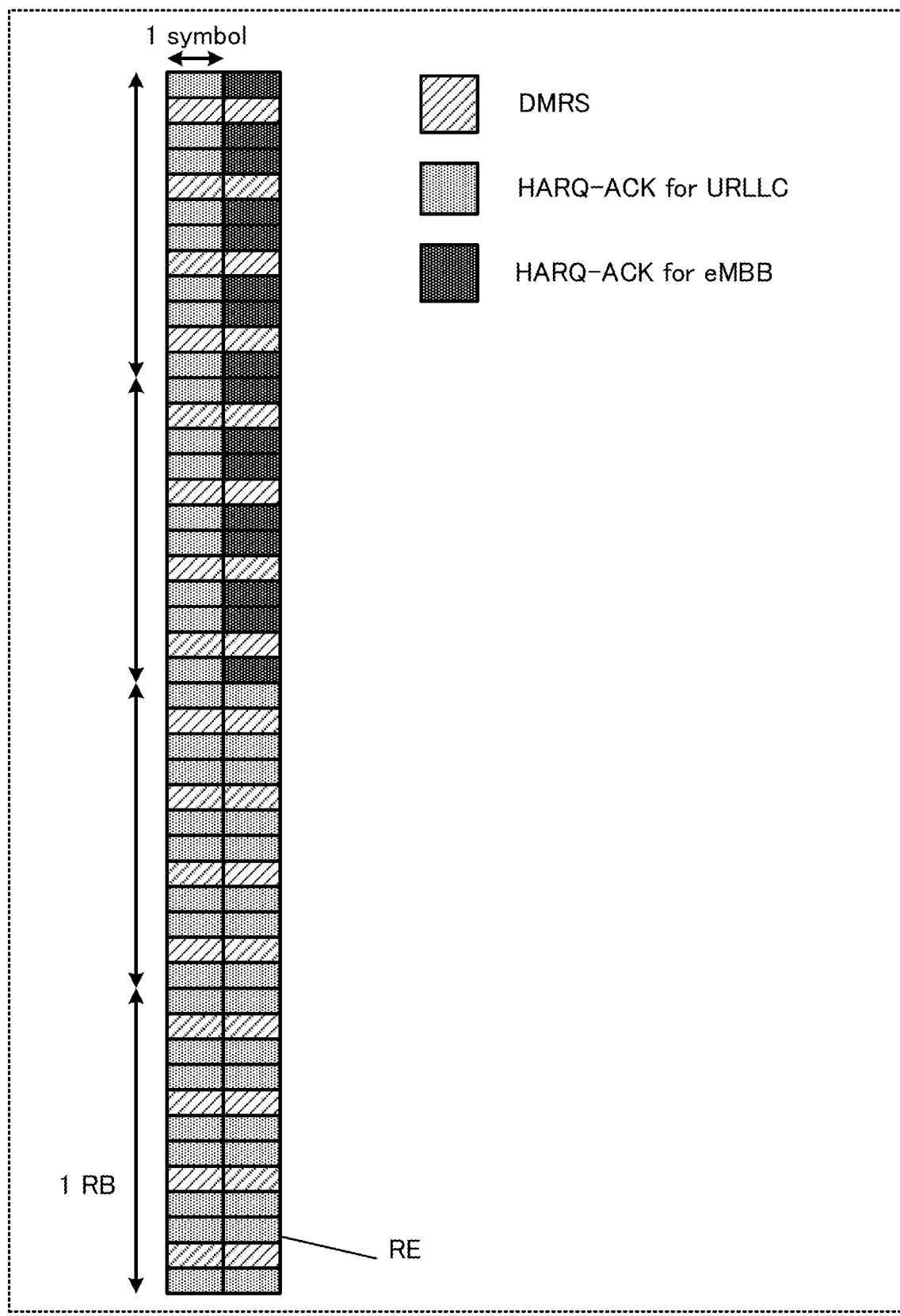
FIG. 6 illustrates an exemplary mapping of ACK/NACK according to Option 1 of Embodiment 1.

FIG. 6 illustrates an exemplary mapping of the response signals to Resource Elements (REs) in Option 1.

In Option 1, terminal 200 maps the modulated symbol sequences obtained by modulating the response signals (HARQ-ACK) to Resource Elements (REs) excluding the REs to which reference signals (RSs; e.g., Demodulation RSs (DMRSs)) are mapped, based on a "Frequency-first-time-second manner", as illustrated in FIG. 6. In other words, terminal 200 maps the response signals in order from the frequency direction to the time direction in PUCCH.

To be more specific, in the mapping to REs, the response signal requiring high reliability or low latency (HARQ-ACK for URLLC in FIG. 6) is mapped to the PUCCH resource first, and then the response signal not requiring very high reliability or very low latency (HARQ-ACK for eMBB in FIG. 6) is mapped to the PUCCH resource, as described above.

In FIG. 6, the HARQ-ACK for URLLC is mapped to all the REs in the first symbol composing PUCCH (except the REs to which DMRSs are mapped) and a part of the REs in the second symbol, and the HARQ-ACK for eMBB is mapped to the rest of the REs in the second symbol, according to the mapping method in Option 1.

For example, the response signal requiring lower latency is mapped to the first symbol of PUCCH according to the mapping method in Option 1, thereby obtaining the effect of reducing the delay in the case of Short PUCCH of two symbols.

[Option 2]

Figure 7:
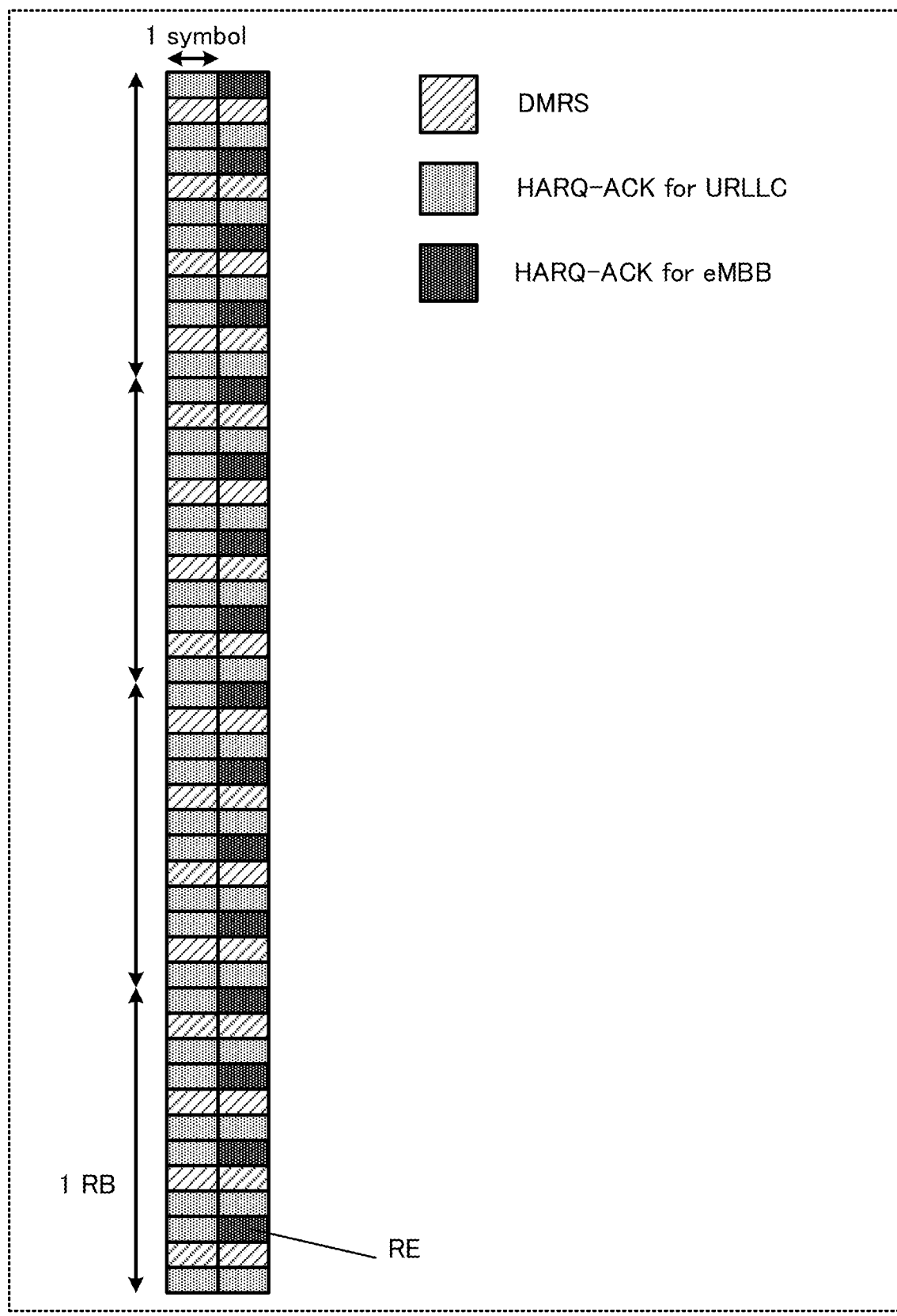
FIG. 7 illustrates an exemplary mapping of ACK/NACK according to Option 2 of Embodiment 1.

FIG. 7 illustrates an exemplary mapping of the response signals to REs in Option 2.

In Option 2, terminal 200 maps the modulated symbol sequences obtained by modulating the response signals (HARQ-ACK) to REs excluding the REs to which reference signals are mapped, based on the "Frequency-first-time-second manner", as illustrated in FIG. 7, as is the case with Option 1. In addition, in Option 2, terminal 200 dispersedly maps the response signals in the frequency direction in the allocated band.

To be more specific, in the mapping to REs, the response signal requiring high reliability or low latency (HARQ-ACK for URLLC in FIG. 7) is mapped to the PUCCH resource first, and then the response signal not requiring very high reliability or very low latency (HARQ-ACK for eMBB in FIG. 7) is mapped to the PUCCH resource, as described above. Further, in FIG. 7, ACK/NACK for URLLC and ACK/NACK for eMBB are dispersedly mapped in the frequency direction.

In FIG. 7, the HARQ-ACK for URLLC is mapped to all the REs in the first symbol composing PUCCH (except the REs to which DMRSs are mapped) and a part of the REs in the second symbol, and the HARQ-ACK for eMBB is mapped to the rest of the REs in the second symbol, according to the mapping method in Option 2. Further, in the second symbol of PUCCH, HARQ-ACK for URLLC and HARQ-ACK for eMBB are each dispersedly mapped in the frequency direction in the assigned band of PUCCH (e.g., 4 Resource Blocks (REs)) in FIG. 7.

According to the mapping method in Option 2, the response signal requiring lower latency is mapped to the first symbol of PUCCH, as with the mapping method in Option 1, thereby obtaining the effect of reducing the delay in the case of Short PUCCH of two symbols.

In addition, the mapping method in Option 2 allows to obtain the frequency diversity effect by mapping dispersedly in the frequency direction, thereby achieving the transmission of the higher quality response signal (i.e., the response signal with higher reliability).

<Case of Long PUCCH>

The following two methods (Option 3 and Option 4) may be applied to the mapping of the response signals to the PUCCH resource in Long PUCCH.

[Option 3]

In Option 3, a method similar to the mapping relationship between HARQ-ACK bits and CSIs (CSI Part 1 and CSI Part 2) in PUCCH Format 3 or PUCCH Format 4 in NR (see NPL 2, for example) is applied to the mapping for the response signals with different reliability, latency requirements or types of use cases (or services).

Figure 8:
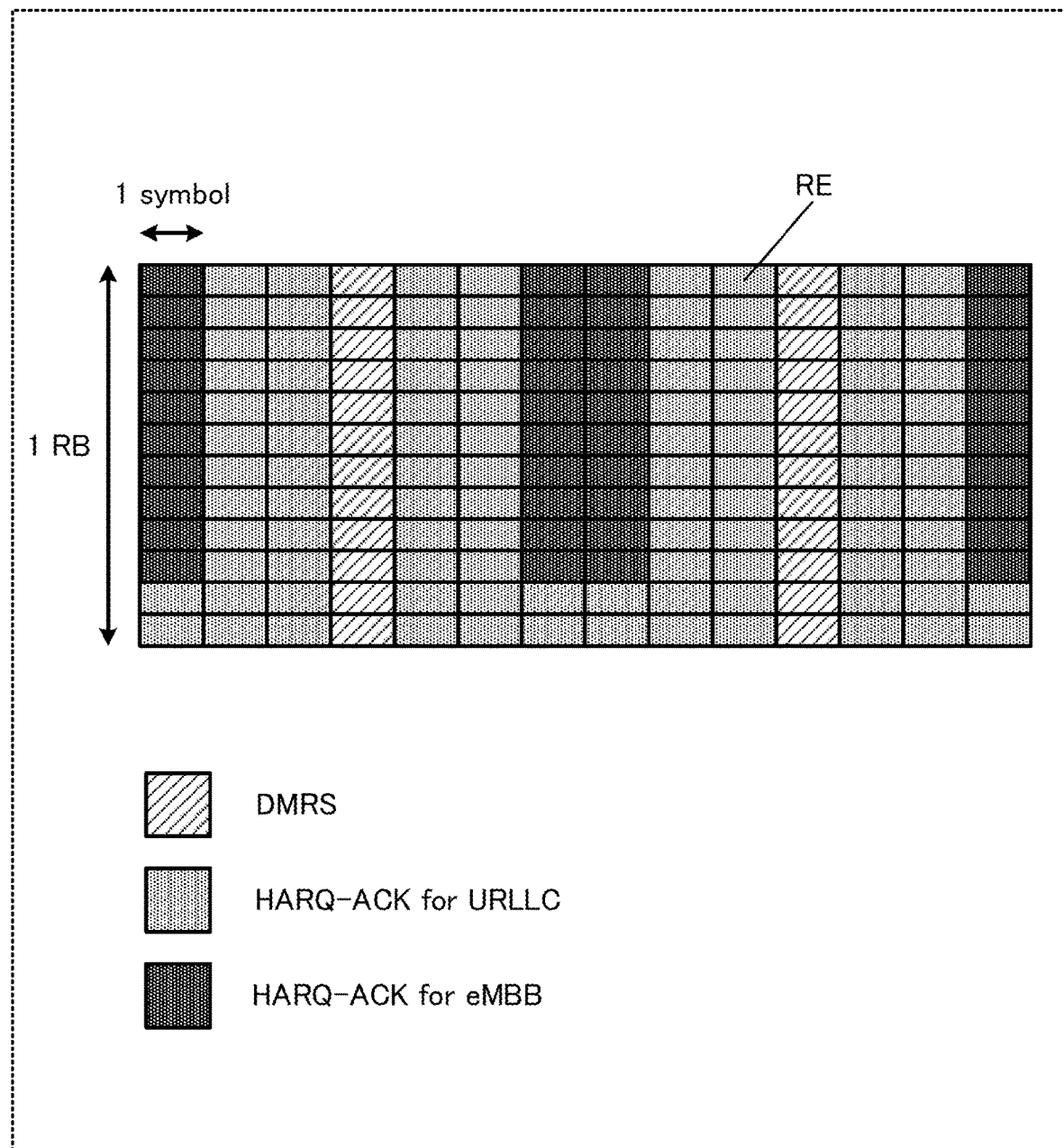
FIG. 8 illustrates an exemplary mapping of ACK/NACK according to Option 3 of Embodiment 1.

FIG. 8 illustrates an exemplary mapping of the response signals to REs in Option 3.

In Option 3, terminal 200 maps the modulated symbol sequences obtained by modulating the response signals (HARQ-ACK) to REs excluding the REs to which RSs (DMRSs in FIG. 8) are mapped, based on the "Frequency-first-time-second manner", as illustrated in FIG. 8. In addition, as illustrated in FIG. 8, terminal 200 maps the response signal requiring higher reliability to symbols closer to the symbol to which the reference signals (e.g., DMRSs) are mapped in PUCCH.

To be more specific, as described above. HARQ-ACK for URLLC requiring high reliability is first mapped from symbols close to the symbols to which DMRSs are mapped (the preceding and succeeding symbols) in the mapping to REs, as illustrated in FIG. 8. HARQ-ACK bits for eMBB not requiring very high reliability are then mapped to the rest of the PUCCH resource, as illustrated in FIG. 8.

According to the mapping method in Option 3, HARQ-ACK bits requiring higher reliability are mapped to symbols with high channel estimation accuracy (symbols close to the symbols to which DMRSs are mapped). Thus, Option 3 makes it possible to achieve the transmission of the higher quality response signal (i.e., the response signal with higher reliability).

[Option 4]

Figure 9:
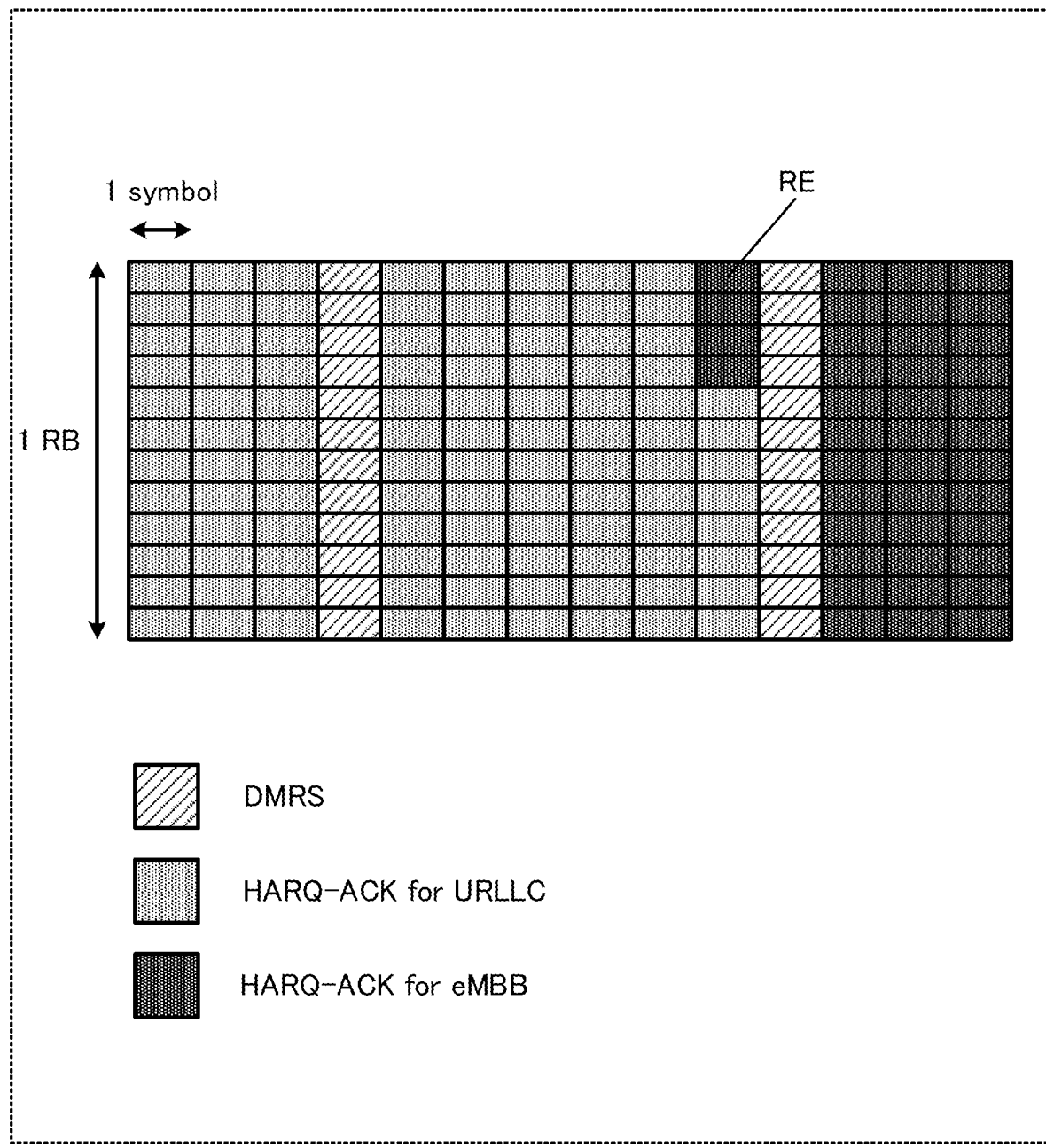
FIG. 9 illustrates an exemplary mapping of ACK/NACK according to Option 4 of Embodiment 1.

FIG. 9 illustrates an exemplary mapping of the response signals to REs in Option 4.

In Option 4, terminal 200 maps the modulated symbol sequences obtained by modulating the response signals (HARQ-ACK) to REs excluding the REs to which RSs are mapped, based on the "Frequency-first-time-second manner", as illustrated in FIG. 9. In addition, terminal 200 maps the response signal requiring lower latency for the latency requirement to earlier symbols of PUCCH, as illustrated in FIG. 9.

To be more specific, as described above, HARQ-ACK for URLLC requiring low latency is first mapped from the earlier symbol (e.g., the first symbol) in the mapping to REs, as illustrated in FIG. 9. HARQ-ACK for eMBB not requiring very low latency is then mapped to the rest of the PUCCH resource, as illustrated in FIG. 9.

According to the mapping method in Option 4, the response signal requiring lower latency is mapped to the first symbol of PUCCH, thereby generating the effect of latency reduction.

The mapping methods for the response signals to the PUCCH resource have been described, thus far.

As described above, terminal 200 preferentially maps the response signal requiring high reliability or low latency, that is, the response signal with a strict requirement, to the PUCCH resource. This enables terminal 200 to preferentially map the response signal requiring higher reliability or lower latency, for example, among the response signals to be multiplexed in PUCCH, to the PUCCH resource capable of achieving the high reliability or the low latency. Thus, terminal 200 can transmit the response signals using the PUCCH resource suitable for the requirement for the response signals, according to the present embodiment.

Option 3 and Option 4 have described mapping methods for response signals in the Long-PUCCH using four or more symbols. However, in URLLC, for example, it is undesirable to use the Long-PUCCH from the viewpoint of latency reduction. Thus, in the present embodiment, the Short-PUCCH may be limited to be the PUCCH that allows multiplexing of the response signals with different reliability, latency requirements, or types of use cases (or services) into a single PUCCH. This makes it possible to omit designs for a plurality of PUCCH formats while meeting the requirement of low latency.

In addition, the mapping methods for the response signals to the PUCCH resource are not limited to Options 1 to 4 described above. Further, any of Options 1 to 4 may be combined with each other, for example. In Option 3 (see FIG. 8) or Option 4 (see FIG. 9), for example, the response signals (HARQ-ACK) may be dispersedly mapped in the frequency direction, as in Option 2 (see FIG. 7).

[Determination Method for PUCCH Resource]

Next, determination methods for the PUCCH resource in the present embodiment will be described.

NR adopts the following method for a terminal to identify the PUCCH resource for transmitting response signals to downlink data. A base station indicates a semi-static PUCCH resource set by UE-specific higher layer signaling (e.g., Radio Resource Control (RRC) singling), and indicates the PUCCH resource to be actually used in the PUCCH resource set by Downlink Control Information (DCI) for assigning the downlink data (see NPL 3, for example).

Herein, the PUCCH resource is configured with a parameter composed of, for example, at least one of a symbol position in a slot, the number of symbols in a slot, a position in frequency domain, the number of resources in frequency domain (e.g., the number of RBs or Physical RBs (PRBs)), whether to apply frequency hopping, and a code resource (e.g., a cyclic shift sequence or an orthogonal cover code).

The base station can also indicate a plurality of PUCCH resource sets to the terminal. The terminal can determine which PUCCH resource set to be used among the plurality of indicated PUCCH resource sets based on the number of bits of Uplink Control Information (UCI) to be transmitted using PUCCH.

In the present embodiment, terminal 200 determines the PUCCH resource set based on the total number of bits of the encoded response signals (HARQ-ACK) to be multiplexed to PUCCH.

In addition, in the present embodiment, different values for the parameters relating to the determination of the PUCCH resource may be respectively configured for response signals with different reliability, latency requirements, or types of use case (or services) (i.e., response signal with different requirements).

In NR, the maximum coding rate is configured for each PUCCH format, for example. The terminal determines the number of RBs to be used for transmitting PUCCH, based on the number of bits of UCI to be transmitted using PUCCH and the maximum coding rate. Note that the maximum number of RBs to be used for transmitting PUCCH is the number of RBs for the PUCCH resource to be indicated by the PUCCH resource set described above.

In the present embodiment, the maximum coding rate is configured for each PUCCH format and for each reliability, latency requirement, or type of use cases (or services) of the response signals (i.e., for each requirement for the response signals).

For example, terminal 200 calculates the resource amount (e.g., the number of REs) to be used for transmitting the response signals for each of the response signals with different reliability, latency requirements or types of use cases (or services) based on the number of bits of encoded response signals and the configured maximum coding rate. Then, on the basis of the number of REs to be used for transmitting each of the response signals to be multiplexed in a single PUCCH, terminal 200 determines the number of RBs to be used for transmitting the PUCCH.

This enables terminal 200, for example, to determine the PUCCH resource set for PUCCH where the response signals with different requirements are multiplexed, on the basis of the number of bits of the response signals encoded by the encoding method configured for each response signal, as described above. For example, terminal 200 can calculate an appropriate resource amount according to the reliability, the latency requirement, or the type of use cases (or services) of the response signal, thereby achieving efficient PUCCH transmission from the viewpoint of the resource utilization efficiency.

Note that the maximum number of RBs to be used for transmitting PUCCH is the number of RBs for the PUCCH resource to be indicated by the PUCCH resource set as described above. Thus, when the number of RBs determined from the number of bits of the response signal and the maximum coding rate exceeds the maximum value indicated by the PUCCH resource set, for example, the actual coding rate of the response signal exceeds the configured maximum coding rate in some cases. This case causes a possibility of failing to meet the required quality of the PUCCH transmission.

Thus, terminal 200 may drop a part of the response signal to be transmitted using PUCCH when the actual coding rate of the response signal exceeds a predetermined threshold, in the present embodiment. This allows the resource for the dropped part of the response signal to be used for the remaining response signal in the PUCCH resource, thereby improving the quality of the PUCCH transmission.

The threshold here may include, for example, the maximum coding rate configured for each PUCCH format and for each reliability, latency requirement or type of use cases (or services) of the response signal. Besides the maximum coding rate, a threshold for dropping a part of the response signal may also be newly indicated from base station 100 to terminal 200.

Further, terminal 200 may drop at least a part of the response signal to be transmitted using PUCCH when the number of RBs calculated from the number of bits of the response signal (or UCI) to be transmitted using PUCCH and the maximum coding rate exceeds a predetermined threshold (the maximum value). This allows the resource for the dropped part of the response signal to be used for the remaining response signal in the PUCCH resource, thereby improving the quality of the PUCCH transmission.

Additionally, the response signal to be dropped may be determined according to a priority configured according to the reliability, the latency requirement or the type of use cases (or services) of the response signal (i.e., a priority configured for each requirement). For example, terminal 200 may preferentially transmit the response signal with a high priority requirement. In other words, terminal 200 may preferentially drop the response signal with a low priority requirement.

As an example of the priority, in URLLC for example, when the reliability of the response signals is different from each other, the priority of the response signal to the downlink data where the target error rate of the first data transmission is high (e.g., $BLER=10^{-1}$) is configured to be higher than the priority of the response signal to the downlink data where the target error rate of the first data transmission is low (e.g., $BLER=10^5$). In addition, when the latency requirements or the types of use cases (or services) of the response signals are different from each other, for example, the priority of URLLC is configured to be higher than the priority of eMBB.

Terminal 200 may drop from the response signal with low priority when at least one of the coding rates for the response signals with different reliability, latency requirements, or types of use cases (or services) exceeds the threshold. This prevents the deterioration of the transmission quality of the response signal with high priority, that is, the response signal requiring higher reliability.

When there are response signals with different reliability, latency requirements, or types of use cases (or services), information indicating a sharing or dividing ratio of the resources (e.g., REs) in PUCCH for the response signals (e.g., a resource sharing factor or a resource splitting factor) may be indicated in advance from base station 100 to terminal 200.

The determination methods for the PUCCH resource have been described, thus far.

As described above, in the present embodiment, terminal 200 determines the processing mode for the response signal or PUCCH according to the requirement (e.g., the reliability, the latency requirement, or the type of use cases/services) for the response signal to the downlink data. To be more specific, terminal 200 applies different encoding methods for the response signals with different requirements. Terminal 200 then multiplexes the encoded response signals to PUCCH, and transmits the signals.

Thus, even when the response signals with different requirements are multiplexed to PUCCH, the present embodiment enables terminal 200 to perform processing (e.g., encoding processing) or configuration of the radio resource (e.g., determination of the mapping method or the PUCCH resource) according to the requirements for the response signals multiplexed to PUCCH respectively. For example, terminal 200 can improve the resource utilization efficiency in PUCCH by configuring the position or the amount of the PUCCH resource according to the reliability required for the response signal. Further, for example, terminal 200 can reduce the latency of the response signal by configuring the position of the PUCCH resource according to the latency requirement for the response signal.

As described above, terminal 200 can appropriately transmit UCI including response signals according to the present embodiment.

Embodiment 2

A base station and a terminal according to the present embodiment have the same basic configurations as base station 100 and terminal 200 according to Embodiment 1, and thus FIGS. 2 and 3 will be used for the description.

In the present embodiment, terminal 200 applies different determination methods for PUCCH resources or PUCCH resource sets to response signals with different reliability, latency requirements, or types of use cases (or services) (i.e., response signals with different requirements).

In addition, the number of PUCCHs where terminal 200 can transmit the response signals in a single slot is not limited to one in the present embodiment. In other words, the number of PUCCHs where terminal 200 can transmit the response signals in a single slot is one or more in the present embodiment.

For example, terminal 200 transmits response signals with different requirements respectively using different PUCCHs in a slot. A plurality of PUCCHs are multiplexed in the same slot by Time Division Multiplexing (TDM), Frequency Division Multiplexing (FDM), or Code Division Multiplexing (CDM), for example.

This enables terminal 200 to allocate an appropriate PUCCH resource for each response signal according to the reliability, the latency requirement or the type of use cases (or services) of the response signal. In other words, terminal 200 can transmit the response signals with different requirements using separate PUCCHs without multiplexing to a single PUCCH. Thus, efficient PUCCH transmission can be achieved from the viewpoint of the resource utilization efficiency.

Further, according to the present embodiment, terminal 200 can transmit the response signals with different latency requirements using different PUCCHs, for example. This enables to transmit the response signal requiring low latency, such as URLLC, using a Short-PUCCH, and to transmit the response signal not requiring very low latency, such as eMBB, using a Long-PUCCH, for example, thereby eliminating the bottleneck for the latency requirement.

For example, base station 100 indicates semi-static PUCCH resource sets by UE-specific higher layer signaling (e.g., RRC signaling) for the identification of the PUCCH resources for transmitting the response signals to the downlink data in terminal 200.

Terminal 200 determines PUCCH resource sets based on either of the following two methods (Option 1 and Option 2), for example.

[Option 1]

In Option 1, different groups of PUCCH resource sets are respectively configured for the response signals with different reliability, latency requirements, or types of use cases (or services) (i.e., the response signals with different requirements). Thus, terminal 200 respectively configures the PUCCH resource sets included in the different groups for response signals with different requirements.

FIG. 10A illustrates exemplary configurations of the PUCCH resource sets in Option 1.

The PUCCH resource set group for eMBB (e.g., group X) and the PUCCH resource set group for URLLC (e.g., group Y) are configured in FIG. 10 A. For example, group X includes PUCCH resource sets X0, X1, X2, and X3, and group Y includes PUCCH resource sets Y0, Y1, Y2, and Y3 in FIG. 10A.

Terminal 200 determines which PUCCH resource set in each group to be used for each of the response signals with different reliability, latency requirements, or types of use cases (or services), for example, based on the number of bits of UCI (e.g., the number of HARQ-ACK bits) to be transmitted using PUCCH.

For example, in FIG. 10A, terminal 200 selects PUCCH resource set X1 from the PUCCH resource sets in group X based on the number of bits of the response signal for eMBB. Terminal 200 also selects PUCCH resource set Y0 from the PUCCH resource sets in group Y based on the number of bits of the response signal for URLLC in FIG. 10A.

The PUCCH resource to be actually used in the selected PUCCH resource set is indicated to terminal 200 by DCI that assigns the downlink data corresponding to each of the response signals with different reliability, latency requirements, or types of use cases (or services) (e.g., DL assignment for eMBB or DL assignment for URLLC illustrated in FIG. 10B). Terminal 200 transmits the response signal using the PUCCH resource indicated by the DCI in the selected PUCCH resource set.

According to Option 1, PUCCH resource sets are individually configured for each reliability, latency requirement, or type of use cases (or services), thereby enabling more flexible allocation of PUCCH resources suitable for response signals with different reliability, latency requirements, or types of use cases (or services).

Note that the configurations of the PUCCH resource sets illustrated in FIG. 10A are examples and not limited thereto. For example, the number of PUCCH resource sets included in the PUCCH resource set groups for eMBB and URLLC is not limited to four, and may include other numbers. Additionally, the number of PUCCH resource sets included in each of the PUCCH resource set groups for eMBB and URLLC may be the same or different from each other. Further, although eMBB and URLLC have been described as an example of a case of different requirements in FIG. 10A, the case is not limited thereto, and the PUCCH resource set groups may be configured according to at least one of different reliability and different latency requirements, for example.

[Option 2]

In Option 2, the same PUCCH resource set group is configured for the response signals with different reliability, latency requirements, or types of use cases (or services) (i.e., the response signals with different requirements). Thus, terminal 200 respectively configures the PUCCH resource sets included in the same group for the response signals with different requirements.

Figure 11A:
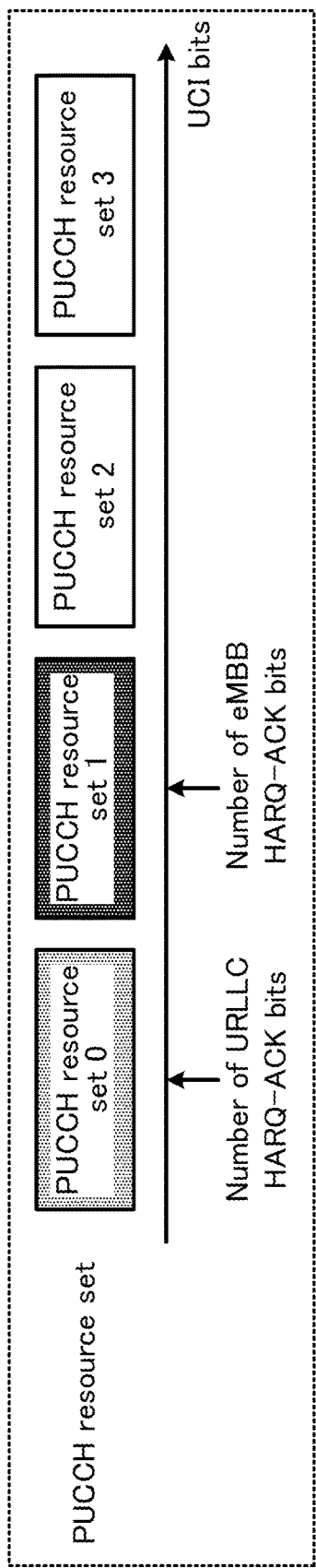
FIG. 11A illustrates an exemplary transmission processing of ACK/NACK according to Option 2 of Embodiment 2.

FIG. 11A illustrates an exemplary configuration of PUCCH resource sets in Option 2.

A group including PUCCH resource sets 0, 1, 2, and 3 is configured in FIG. 11A.

Terminal 200 determines which PUCCH resource set in the same group to be used based on the number of bits of UCI (e.g., the number of HARQ-ACK bits) to be transmitted using PUCCH, for example, regardless of the reliability, the latency requirements, or the types of use cases (or services).

For example, in FIG. 11A, terminal 200 selects PUCCH resource set 1 from PUCCH resource sets 0 to 3 based on the number of bits of the response signal for eMBB. Terminal 200 also selects PUCCH resource set 0 from PUCCH resource sets 0 to 3 based on the number of bits of the response signal for URLLC in FIG. 11A.

Figure 11B:
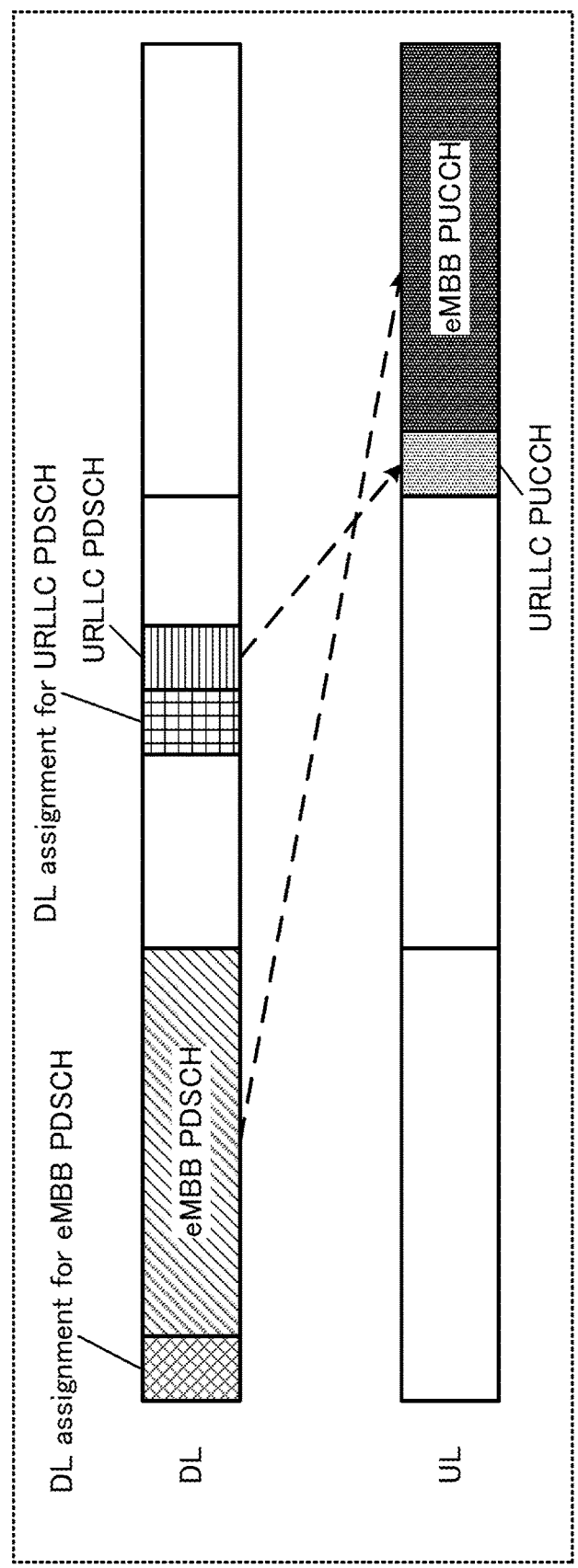
FIG. 11B illustrates another exemplary transmission processing of ACK/NACK according to Option 2 of Embodiment 2.

The PUCCH resource to be actually used in the selected PUCCH resource set is indicated to terminal 200 by DCI that assigns the downlink data corresponding to each of the response signals with different reliability, latency requirements, or types of use cases (or services) (e.g., DL assignment for eMBB or DL assignment for URLLC illustrated in FIG. 11B). Terminal 200 transmits the response signal using the PUCCH resource in the selected PUCCH resource set indicated by the DCI.

According to Option 2, selectable PUCCH resource sets are the same regardless of the reliability, the latency requirements, or the types of use cases (or services). This reduces the overhead relating to the indication of the PUCCH resource sets.

Further, terminal 200 can individually determine the PUCCH resource set to be actually used based on each number of bits of the response signals with different reliability, latency requirements, or types of use cases (or services). This enables terminal 200 to use the PUCCH resource suitable for each of the response signals with different reliability, latency requirements, or types of use cases (or services).

The determination methods for the PUCCH resource set have been described, thus far.

As described above, terminal 200 respectively applies different resource determination methods to response signals with different requirements (e.g., reliability, latency requirements, or types of use cases/services) in the present embodiment. Terminal 200 then transmits the response signals using the PUCCH resources configured for the respective response signals.

Thus, the present embodiment enables terminal 200 to individually configure the radio resource according to the requirement for the response signal, thereby improving the resource utilization efficiency or reducing the latency of the response signal. Therefore, terminal 200 can appropriately transmit UCI including response signals according to the present embodiment.

The present embodiment has described methods of determining different PUCCH resources or different PUCCH resource sets for response signals with different reliability, latency requirements, or types of use cases (or services). When the same PUCCH resource is determined for each response signal based on the resource determination methods in the present embodiment, however, terminal 200 may apply the same processing as that in Embodiment 1.

Further, Option 1 according to the present embodiment has described a case where different PUCCH resource set groups are configured according to the reliability, the latency requirement, or the type of use cases (or services). In addition to that, different configurable values (or value ranges) may be set for the parameters relating to the PUCCH resource set according to the reliability, the latency requirement, or the type of use cases (or services).

For example, a Sequence selection is used in PUCCH Format 0 in NR (see NPL 1, for example). Additionally, in Release 15 NR, the transmission bandwidth allocatable for PUCCH transmission is 1 RB, and a transmission sequence with a sequence length of 12, corresponding to 1 RB=12 subcarriers, is used. Further, the frequency allocation for one cell reuse is used in NR. In the one cell reuse, the main factor of the performance deterioration is inter-cell interference. In particular, a small number of symbols (1 or 2 symbols) are used in the Short-PUCCH, thereby failing to prevent the inter-cell interference with an averaging effect of interference by using a plurality of symbols.

Thus, when high reliability is required for a response signal, the inter-cell interference needs to be prevented. Extension of the transmission bandwidth (the sequence length) is effective as a method of preventing the inter-cell interference (see NPL 6, for example).

In this regard, the number of RBs or the sequence length configurable for PUCCH may be made different, for example, according to the response signals with different reliability, latency requirements, or types of use cases (or services) in PUCCH Format 0.

For example, a variable number of PRBs (e.g., any of 1, 2, and 4 PRBs) may be configured in a PUCCH resource set for a response signal requiring high reliability. Meanwhile, the configurable number of PRBs may be 1 PRB in a PUCCH resource set for a response signal not requiring high reliability. Note that the number of PRBs configurable for each requirement is not limited to the above examples, and may be other numbers.

This enables to prevent the inter-cell interference by expanding the transmission bandwidth (the sequence length) even when high reliability is required for a response signal in PUCCH Format 0.

In addition, repeated transmission (Repetition) in time domain is an effective technique for improving characteristics for PUCCH Format 0.

In this regard, the configurable number of Repetitions for PUCCH may be made different, for example, according to the response signals with different reliability, latency requirements, or types of use cases (or services) in PUCCH Format 0.

For example, Repetition and a variable number of Repetitions (e.g., any of 1, 2, and 4 times) may be configured in a PUCCH resource set for a response signal requiring high reliability. Meanwhile, Repetition may not be configured in a PUCCH resource set for a response signal not requiring high reliability. Note that the number of Repetitions configurable for each requirement is not limited to the above examples, and may be other numbers.

This enables to obtain an effect of improving characteristics by performing Repetition even when high reliability is required for a response signal in PUCCH Format 0.

Note that the Repetition in the time domain includes a method of repeatedly transmitting the same sequence over a plurality of symbols. In this method, in-phase combination of the Repetition signals on the receiving side (e.g., base station 100) is expected to bring the effect of improving characteristics by improving the power of the received signals. The Repetition in the time domain also includes a method of extending a sequence length and transmitting a part of the extended sequence in a different symbol. For example, the sequence length is extended from 12 to 24, the first half of the sequence length of 24 is transmitted in the first symbol, and the second half is transmitted in the next symbol. In this method, an effect of preventing the interference can be expected by using a long sequence length.

As described above, parameters different from those in Release 15 NR can be configured for a PUCCH resource set for a response signal requiring high reliability in PUCCH format 0. This enables PUCCH transmission achieving a requirement relating to the reliability of the response signal in URLLC that allows retransmission (e.g., the error rate of $BLER=10^{-4}$ or less), which is not considered in Release 15 NR.

Variation of Embodiment 2

Embodiment 2 has described a case of applying different determination methods for PUCCH resources or PUCCH resource sets to response signals with different reliability, latency requirements, or types of use cases (or services).

NR adopts the following method for a terminal to identify the slot position of PUCCH for transmitting response signals to downlink data (or the time from a slot receiving downlink data to a slot transmitting PUCCH). A base station indicates a semi-static slot position set by UE-specific higher layer signaling (e.g., RRC singling), and indicates the slot position to be actually used in the slot position set by DCI for assigning the downlink data (see NPL 3, for example).

Thus, in the variation of Embodiment 2, the slot position set for PUCCH for transmitting a response signal can also be configured for each of the response signals with different reliability, latency requirements, or types of use cases (or services) (i.e., the response signals with different requirements).

According to the variation of Embodiment 2, terminal 200 can use an appropriate transmission slot for the response signal according to the reliability, the latency requirement or the type of use cases (or services) of the response signal. When different slot position sets are respectively configured for different latency requirements, for example, terminal 200 can perform more flexible slot allocation suitable for the latency requirement for each of the response signals with different latency requirements, in a case of respectively transmitting the response signals with different latency requirements using different PUCCHs.

Embodiment 3

A base station and a terminal according to the present embodiment have the same basic configurations as base station 100 and terminal 200 according to Embodiment 1, and thus FIGS. 2 and 3 will be used for the description.

In the present embodiment, terminal 200 drops all PUCCH or punctures apart of PUCCH transmitting a response signal, according to the priority of PUCCH at the time of simultaneously transmitting response signals to data transmission with different reliability, latency requirements, or types of use cases (or services) in the same slot.

The PUCCH to be dropped or partially punctured may be determined based on the priority assigned depending on the reliability, the latency requirement, or the type of use cases (or services) of ACK/NACK.

To be more specific, when the transmission timings of the response signals with different requirements are the same, terminal 200 drops all or punctures a part of PUCCH whose priority based on the requirement is lower.

The case where the reliability of the response signals is different from each other will be described as an example of the priorities of PUCCH. In URLLC for example, the priority of PUCCH transmitting the response signal to the downlink data where the target error rate of the first data transmission is high (e.g., BLER=$10^{-1}$) is configured to be higher than the priority of PUCCH transmitting the response signal to the downlink data where the target error rate of the first data transmission is low (e.g., BLER=$10^{-1}$). That is, terminal 200 drops all or punctures a part of PUCCH transmitting the response signal to the downlink data where the target error rate of the first data transmission is low (e.g., BLER=$10^{-5}$).

Figure 12:
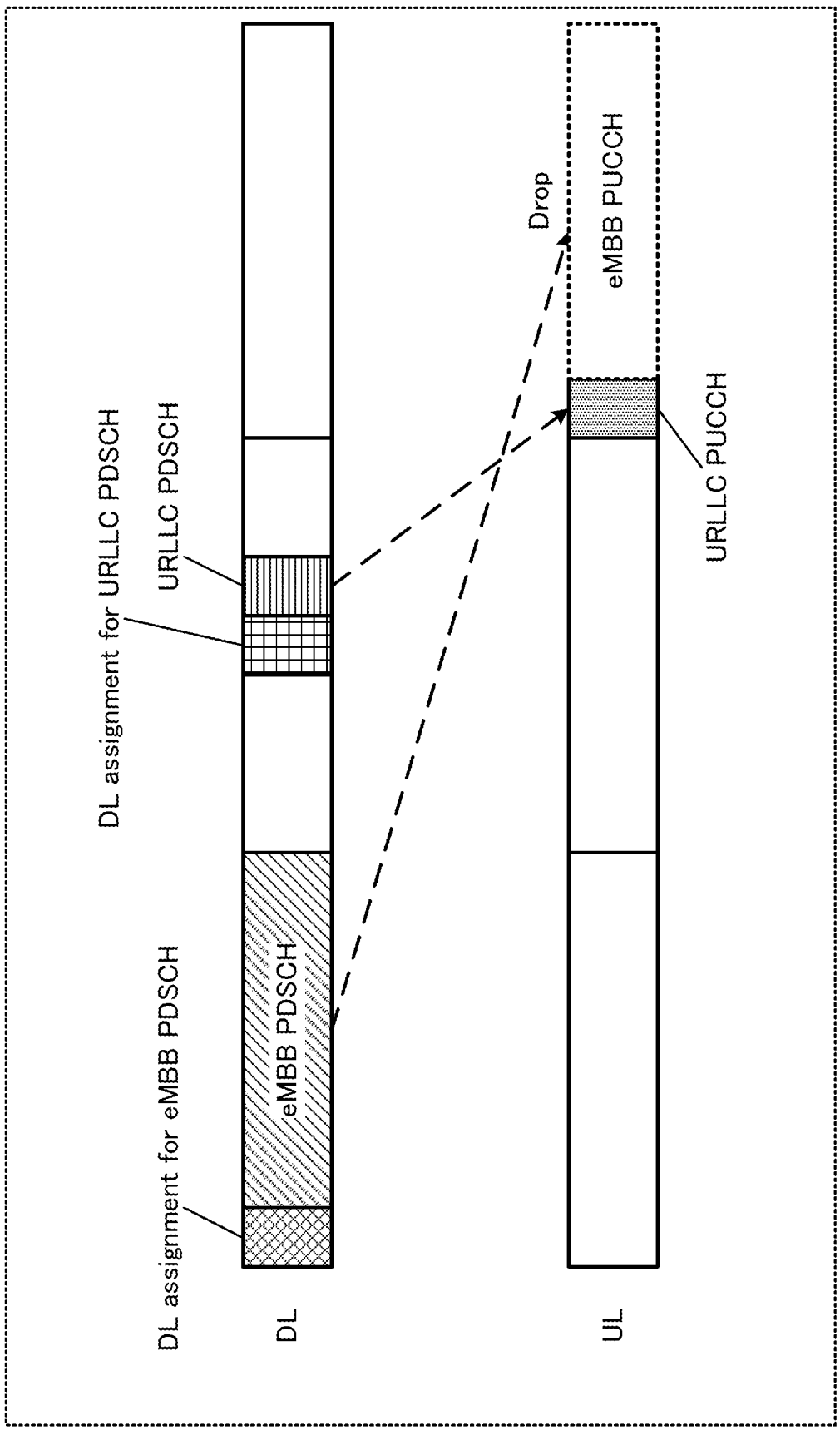
FIG. 12 illustrates an exemplary transmission processing of ACK/NACK according to Embodiment 3.

Descriptions will also be given of the case where the latency requirements or the types of use cases (or services) of the response signals are different from each other. For example, FIG. 12 illustrates a case including two services of URLLC and eMBB. The priority of PUCCH corresponding to URLLC is configured to be higher than the priority of PUCCH corresponding to eMBB. That is, terminal 200 drops all or punctures a part of PUCCH corresponding to eMBB. In FIG. 12, for example, terminal 200 transmits the response signal corresponding to URLLC using PUCCH corresponding to URLLC (URLLC PUCCH), and drops all of PUCCH corresponding to eMBB (eMBB PUCCH).

The present embodiment enables to prevent the influence on the PUCCH transmission for a response signal requiring higher reliability or low latency by the PUCCH transmission for another response signal, thereby guaranteeing the quality of the response signal requiring higher reliability or low latency.

Note that methods of puncturing a part of PUCCH include, for example, a method of puncturing a symbol where the PUCCH transmissions of different response signals are overlapped in time with each other, or a method of puncturing an RE where the PUCCH transmissions of different response signals are overlapped in time and frequency with each other.

The method of puncturing the symbol overlapping in time can be applied, for example, when terminal 200 is not capable of simultaneously transmitting a plurality of uplink signals, or when terminal 200 has to transmit either one of a plurality of uplink signals due to the sum of the transmission power exceeding the maximum transmission power while being capable of simultaneously transmitting the plurality of uplink signals.

Meanwhile, the method of puncturing an RE overlapping in time and frequency can be applied, for example, when terminal 200 is capable of simultaneously transmitting a plurality of uplink signals, and the simultaneous transmission of the plurality of uplink signals does not cause an excess of the maximum transmission power of terminal 200.

Embodiment 4

Embodiment 1 has described a case of applying different encoding processes to response signals with different reliability, latency requirements, or types of use cases (or services), for example. Performing different encoding processes, however, increases the computational complexity of a terminal, and may cause the implementation to be complicated.

Thus, the present embodiment will describe a method of applying a single encoding process to response signals with different reliability, latency requirements, or types of use cases (or services).

A base station and a terminal according to the present embodiment have the same basic configurations as base station 100 and terminal 200 according to Embodiment 1, and thus FIGS. 2 and 3 will be used for the description.

Terminal 200 has a capability relating to a processing time required for receiving downlink data, decoding the downlink data, generating a response signal, and transmitting PUCCH (UE capability, hereinafter referred to as "N1"). In NR, terminal 200 reports "N1" to base station 100.

Base station 100 configures a slot position of PUCCH for terminal 200 to transmit a response signal to the downlink data (or the time from a slot receiving the downlink data to a slot transmitting PUCCH (e.g., the response signal): "PDSCH-to-HARQ-ACK timing"), and indicates to terminal 200. At this time, base station 100 cannot configure and indicate a value that exceeds the processing capacity (N1) of terminal 200 reported by terminal 200 (i.e., a value smaller than N1) in terms of the PDSCH-to-HARQ-ACK timing.

In the present embodiment, terminal 200 defines the capability (N1) for transmission of the response signals with different reliability, latency requirements, or types of use cases (or services) respectively, and reports to base station 100. Terminal 200 also determines a transmission method and a parameter for the response signal or PUCCH to be used for the transmission of the response signal (i.e., the processing mode for the response signal or PUCCH), based on the value of the PDSCH-to-HARQ-ACK timing configured and indicated by base station 100 and the defined value of N1.

For example, terminal 200 has two or more capabilities (Nis) according to the reliability, the latency requirements, or the types of use cases (or services) in terms of the capability relating to a processing time required for receiving downlink data, decoding the downlink data, generating a response signal, and transmitting PUCCH. Terminal 200 reports two or more capabilities (Nis) to base station 100.

As an example, terminal 200 may have two UE capabilities of N1 for eMBB (hereinafter referred to as "N1_X" or "N1_eMBB"), and N1 for URLLC (hereinafter referred to as "N1_Y" or "N1_URLLC"). For example, low latency is more likely to be required in URLLC than eMBB, and thus N1 for URLLC may be configured to be less than N1 for eMBB.

As described in the variation of Embodiment 2, with regard to the identification of the slot position of PUCCH for transmitting response signals to the downlink data (PDSCH-to-HARQ-ACK timing), base station 100 indicates a semi-static slot position set by UE-specific higher layer signaling (e.g., RRC singling), and indicates which PDSCH-to-HARQ-ACK timing in the set is actually used by DCI for assigning the downlink data.

When the response signals corresponding to the data transmission with different reliability, latency requirements, or types of use cases (or services) are simultaneously transmitted in the same slot, terminal 200 determines the processing for the response signals based on the value of the PDSCH-to-HARQ-ACK timing for each of the response signals and the capability (N1) of terminal 200.

Figure 13:
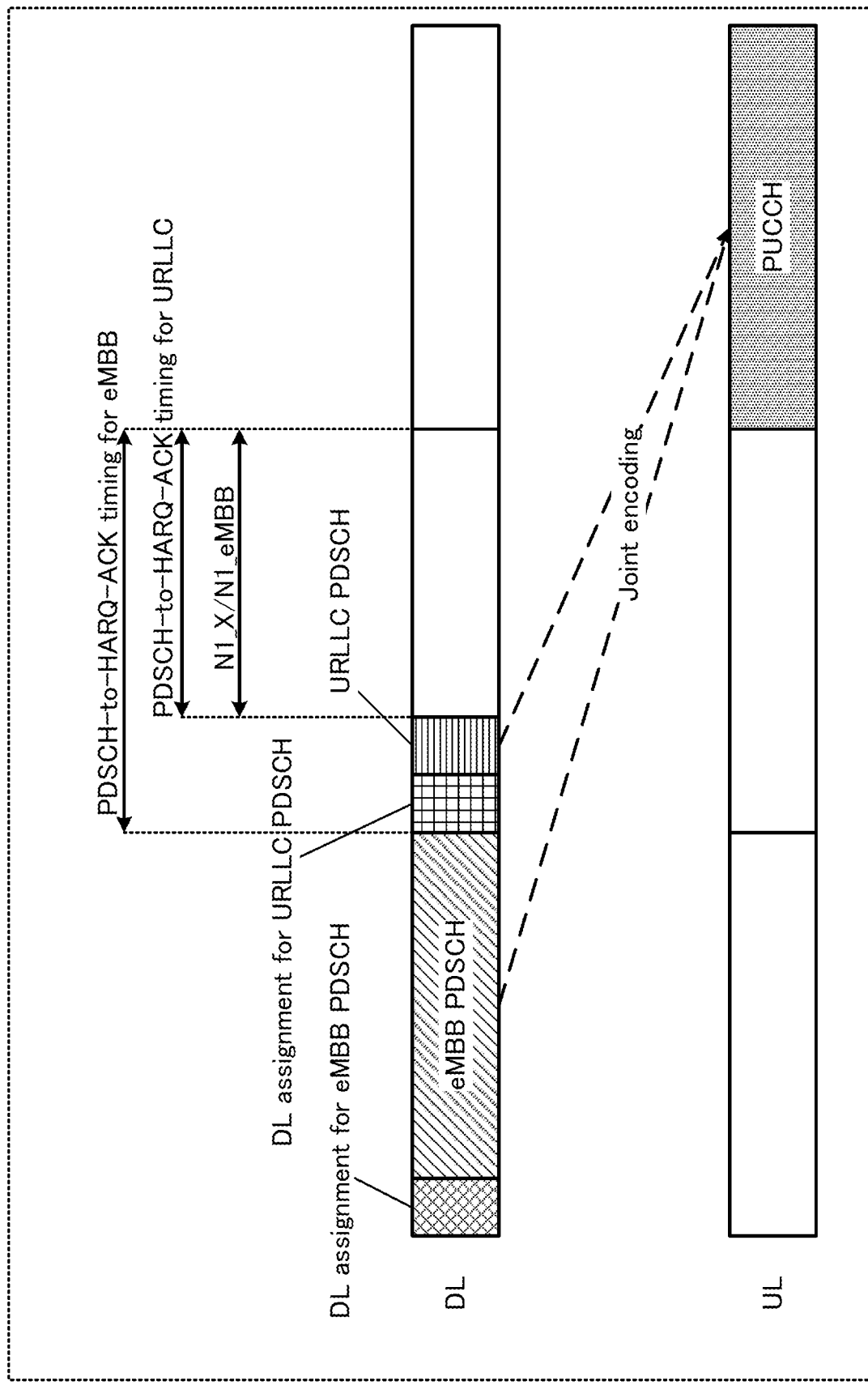
FIG. 13 illustrates an exemplary transmission processing of ACK/NACK according to Embodiment 4.

As illustrated in FIG. 13, when the smallest value among the PDSCH-to-HARQ-ACK timing values for response signals (the PDSCH-to-HARQ-ACK timing for URLLC in FIG. 13) is equal to or greater than N1 for eMBB (N1_X or N1_eMBB), for example, terminal 200 performs a common encoding process (joint encoding) on the response signals corresponding to eMBB and URLLC and generates HARQ-ACK bits.

To be more specific, in FIG. 13, terminal 200 can complete the processing of generating the response signal corresponding to eMBB and transmitting PUCCH including the response signal during the time from the reception of PDSCH for URLLC until the time equivalent to the PDSCH-to-HARQ-ACK timing for URLLC elapses (i.e., N1_X/N1_eMBB s PDSCH-to-HARQ-ACK timing for URLLC). Thus, terminal 200 can perform the common encoding process on the response signals for URLLC and eMBB during the time from the reception of PDSCH for URLLC until the time equivalent to the PDSCH-to-HARQ-ACK timing for URLLC elapses.

Figure 14:
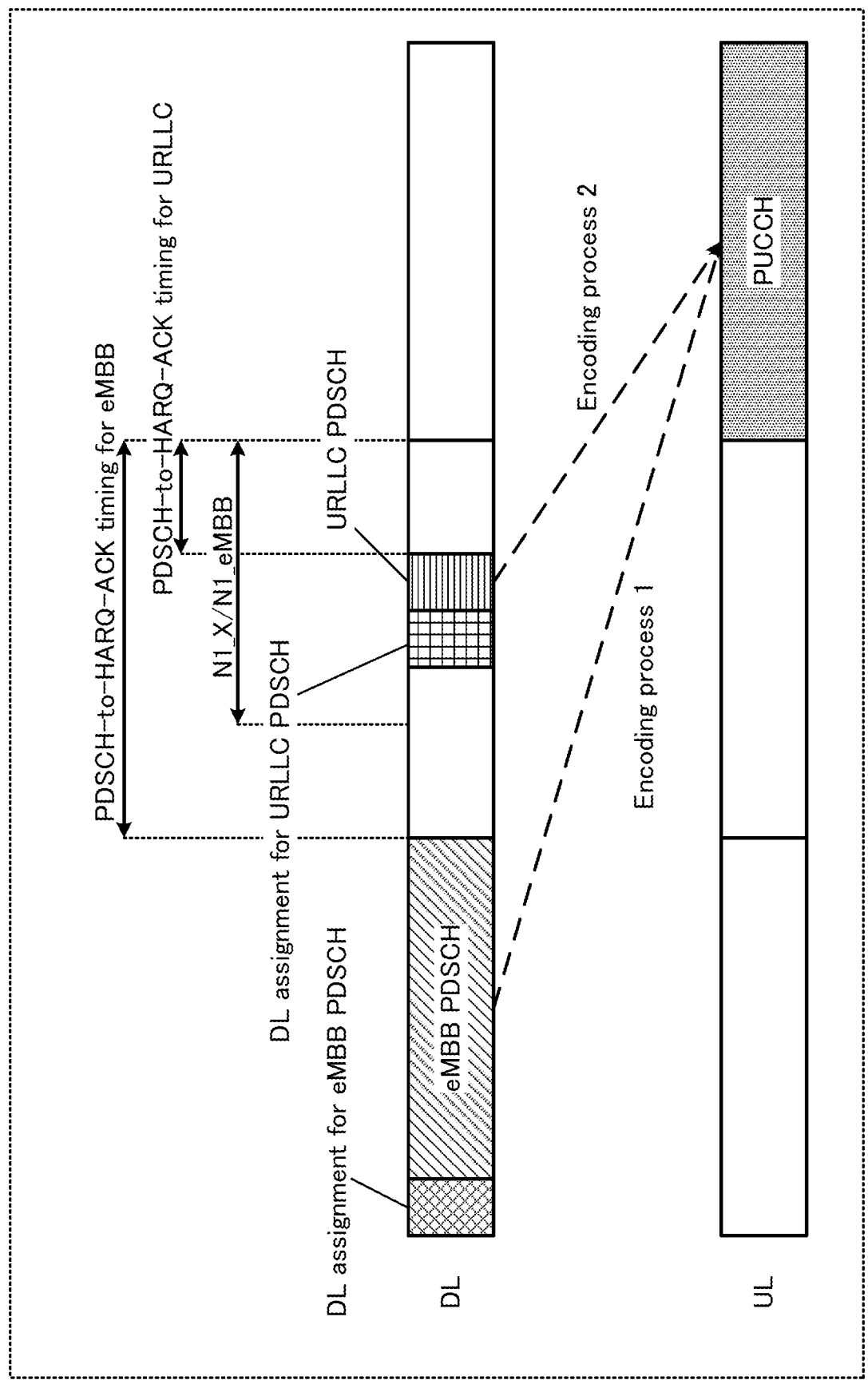
FIG. 14 illustrates another exemplary transmission processing of ACK/NACK according to Embodiment 4.

Meanwhile, as illustrated in FIG. 14, when the value of the PDSCH-to-HARQ-ACK timing for the response signal requiring high reliability or low latency or the response signal corresponding to URLLC (PDSCH-to-HARQ-ACK timing for URLLC in FIG. 14) is less than N1 corresponding to eMBB (N1_X or N1_eMBB), terminal 200 cannot perform a common encoding process on the response signals corresponding to eMBB and URLLC.

To be more specific, in FIG. 14, terminal 200 cannot complete the processing of generating the response signal corresponding to eMBB and transmitting PUCCH including the response signal during the time from the reception of PDSCH for URLLC until the time equivalent to the PDSCH-to-HARQ-ACK timing for URLLC elapses (i.e., N1_X/N1_eMBB>PDSCH-to-HARQ-ACK timing for URLLC).

Thus, terminal 200 cannot perform joint encoding on ACK/NACK for URLLC and ACK/NACK for eMBB during the time from the reception of PDSCH for URLLC until the time equivalent to the PDSCH-to-HARQ-ACK timing for URLLC elapses. In this case, terminal 200 uses either of the methods in Embodiment 3 or Embodiment 1.

For example, the application of the method in Embodiment 3 enables to minimize the encoding process to one as a whole for the response signals with different reliability, latency requirements, or types of use cases (or services), thereby simplifying the implementation of terminal 200. Meanwhile, the application of the method in Embodiment 1 enables terminal 200 to generate HARQ-ACK bits by appropriate encoding (or coding rate) according to the reliability, the latency requirement, or the type of use cases (or service) of the response signal as illustrated in FIG. 14, thereby achieving efficient PUCCH transmission from the viewpoint of the resource utilization efficiency.

As described above, according to the present embodiment, the encoding process can be shared as much as possible in accordance with the processing capability of terminal 200, and it is thus possible to reduce the increase of computational complexity or complexity of the implementation of terminal 200.

Each embodiment of the present disclosure has been described, thus far.

(1) In the above embodiments, transmission methods and parameters of response signals or PUCCHs have been made different from each other according to the reliability, the latency requirements, or the types of the use cases (or services) of the response signals.

Herein, an example of causing a difference in the transmission methods and the parameters of the response signals or PUCCHs is a case where the reliability of the response signals is different from each other. For example, in URLLC, the transmission methods and the parameters of the response signals or PUCCHs may be made different from each other between the response signal to the downlink data with a high target error rate in the first data transmission (e.g., $BLER=10^{-1}$) and the response signal to the downlink data with a low target error rate in the first data transmission (e.g., $BLER=10^{-5}$). While the former response signal requires high reliability, the latter response signal does not require very high reliability.

Other examples of causing a difference in the transmission methods and the parameters of the response signals or PUCCHs are cases where the latency requirements or the use cases (or services) of the response signals are different from each other. For example, the transmission methods and the parameters of the response signals or PUCCHs may be made different from each other between the response signal corresponding to URLLC and the response signal corresponding to eMBB. While the former response signal requires high reliability or low latency, the latter response signal does not require not very high reliability or very low latency. Further, as described above, URLLC includes the response signal to the downlink data with a high target error rate in the first data transmission (e.g., $BLER=10^{-1}$) and the response signal to the downlink data with a low target error rate in the first data transmission (e.g., $BLER=10^{-5}$) in some cases.

Examples of causing a difference in the transmission methods of the response signals or PUCCHs are not limited to the cases where reliability, latency requirements, or types of use cases (services) are different, and may include, for example, cases where parameters of physical layers are different from each other. For example, eMBB may be replaced with "slot-unit transmission", and URLLC may be replaced with "non-slot-unit transmission". eMBB may also be replaced with "PDSCH mapping type A" or "PUSCH mapping type A", and URLLC may also be replaced with "PDSCH mapping type B" or "PUSCH mapping type B". In addition, the present disclosure is not limited to transmissions corresponding to eMBB and URLLC, and for example, eMBB may be replaced with transmission having a long transmission duration (e.g., a slot length or a symbol length), and URLLC may be replaced with transmission having a shorter transmission duration than the transmission duration described above.

Further, in the present disclosure, the target error rate may be the target error rate of the first data transmission as described above, or may be the target error rate of retransmission when the retransmission occurs. Additionally, the target error rate may also be referred to as an "instantaneous target error rate" in the sense of the target error rate for each of the first transmission and the retransmission.

(2) The methods for determining "the reliability, the latency requirement, or the type of use cases (or services)" (i.e., the requirement) of the response signal described in the above embodiments include, for example, the following Examples 1 to 5.

Example 1: Scrambling Sequence

In Example 1, terminal 200 determines the reliability, the latency requirement, or the type of use cases (or services) of the response signal based on a UE-specific scrambling sequence to be used for DCI for scheduling the downlink data transmissions corresponding to the respective response signals.

The UE-specific scrambling sequences such as a Cell-Radio Network Temporary Identifier (C-RNTI) or a Configured Scheduling-RNTI (CS-RNTI) are used for DCI for PDSCH assuming eMBB, for example. Thus, terminal 200 determines that the reliability of the response signal is high, the latency requirement is severe, or it is URLLC when the detected scrambling sequence is different from C-RNTI or CS-RNTI. Meanwhile, terminal 200 determines that the reliability of the response signal is not high, the latency requirement is not severe, or it is eMBB when the detected scrambling sequence is C-RNTI or CS-RNTI.

For example, controller 101 (see FIG. 2, for example) of base station 100 determines information on the reliability, the latency requirement, or the type of use cases (or services) of the downlink data for terminal 200. The determined information is outputted to downlink control signal generator 109 of base station 100. Downlink control signal generator 109 generates a bit string of DCI using a scrambling sequence according to the reliability, the latency requirement, or the type of use cases (or services) of the downlink data for terminal 200, as described above.

Meanwhile, decoder 206 (see FIG. 3, for example) of terminal 200 outputs the detected scrambling sequence to controller 211. Controller 211 determines the information on the reliability, the latency requirement, or the type of use cases (or services) of the downlink data based on the acquired scrambling sequence.

Example 2: MCS Table

In Example 2, terminal 200 determines the reliability, the latency requirement, or the type of use cases (or services) of the response signal based on an MCS table to be used for scheduling the downlink data transmissions corresponding to the respective response signals.

In Release 15 NR, for example, which of the MCS tables to be used can be configured, the MCS table for achieving the target BLER=$10^{-1}$ or the MCS table for achieving the target BLER=$10^{-5}$.

For example, terminal 200 determines that the response signal requires high reliability when the configured MCS table in URLLC is the MCS table for achieving the target BLER=$10^{-1}$. In contrast, terminal 200 determines that the response signal does not require high reliability when the configured MCS table in URLLC is the MCS table for achieving the target BLER=$10^{-5}$.

For example, controller 101 of base station 100 determines information on the reliability, the latency requirement, or the type of use cases (or services) of the downlink data for terminal 200. The determined information is outputted to downlink control signal generator 109, encoder 103, and modulator 105 of base station 100. Downlink control signal generator 109 includes information on the MCS table to be used for downlink data transmission in a bit string of DCI. Further, encoder 103 and modulator 105 encode and modulate the downlink data using the information on the MCS table to be inputted from controller 101.

Meanwhile, decoder 206 of terminal 200 decodes DCI, and outputs the decoding result to controller 211. Controller 211 determines the information on the reliability, the latency requirement, or the type of use cases (or services) of the downlink data, based on the information on the MCS table to be acquired from DCI.

Example 3: PDSCH-to-HARQ-ACK Timing or Number of Transmission Symbols for PDSCH

In Example 3, terminal 200 determines the reliability, the latency requirement, or the type of use cases (or services) of the response signal based on a "PDSCH-to-HARQ-ACK timing" or the number of transmission symbols of PDSCH, indicated by DCI for scheduling the downlink data transmissions corresponding to the respective response signals.

For example, terminal 200 determines that the latency requirement for the response signal is severe or the response signal is for URLLC when the PDSCH-to-HARQ-ACK timing is equal to or less than a predetermined value, or the number of transmission symbols of PDSCH is equal to or less than a predetermined number of symbols. In contrast, terminal 200 determines that the latency requirement for the response signal is not severe or the response signal is for eMBB when the PDSCH-to-HARQ-ACK timing is greater than the predetermined value, or the number of transmission symbols of PDSCH is more than the predetermined number of symbols.

Note that the predetermined value or the predetermined number of symbols may be a value determined in advance in a standard, or a value configurable for terminal 200 by base station 100 using higher layer signaling.

For example, controller 101 of base station 100 determines the PDSCH-to-HARQ-ACK timing indicating a slot position transmitting the response signal to the downlink data for terminal 200 or the number of transmission symbols of PDSCH. The determined information is outputted to downlink control signal generator 109, signal assigner 112, and extractor 118 of base station 100. Downlink control signal generator 109 includes information on the PDSCH-to-HARQ-ACK timing or the number of transmission symbols of PDSCH in a bit string of DCI.

Meanwhile, decoder 206 of terminal 200 decodes DCI, and outputs the decoding result to controller 211. Controller 211 determines the information on the reliability, the latency requirement, or the type of use cases (or services) of the downlink data based on the information on the PDSCH-to-HARQ-ACK timing or the number of transmission symbols of PDSCH to be acquired from DCI.

Example 4: CQI Table

In Example 4, terminal 200 determines the reliability, the latency requirement, or the type of use cases (or services) of the response signal based on a CQI table configured for the downlink data transmissions corresponding to the respective response signals.

In Release 15 NR, for example, which of the CQI tables to be used can be configured, the CQI table for achieving the target BLER=$10^{-1}$ or the CQI table for achieving the target BLER=$10^{-5}$.

For example, terminal 200 determines that the response signal requires high reliability when the configured CQI table in URLLC is the CQI table for achieving the target BLER=$10^{-1}$. In contrast, terminal 200 determines that the response signal does not require high reliability when the configured CQI table in URLLC is the CQI table for achieving the target BLER=$10^{-5}$.

For example, controller 101 of base station 100 determines information on the CQI table to be configured for downlink data transmission for terminal 200. The determined information is outputted to higher-layer control signal generator 106. Higher-layer control signal generator 106 includes the information on the CQI table in a higher-layer control signal.

Meanwhile, decoder 208 of terminal 200 decodes the higher-layer control signal, and outputs the decoding result to controller 211. Controller 211 determines the information on the reliability, the latency requirement, or the type of use cases (or services) of the downlink data, based on the information on the CQI table to be acquired from the higher-layer control signal.

Example 5: Explicit Indication by DCI

In Example 5, terminal 200 determines the reliability, the latency requirement, or the type of use cases (or services) of the response signal by explicit indication provided by several bits in DCI for scheduling the downlink data transmissions corresponding to the respective response signals.

The explicit indication may be information on the reliability, the latency requirement, or the type of use cases (services) of the response signal itself, and may also be information on the reliability (e.g., the target BLER), the latency requirement, or the type of use cases (services) of PDSCH.

For example, controller 101 of base station 100 determines information on the reliability, the latency requirement, or the type of use cases (or services) of the response signal to the downlink data for terminal 200. The determined information is outputted to downlink control signal generator 109. Downlink control signal generator 109 includes the information on the reliability, the latency requirement, or the type of use cases (or services) of the response signal in a bit string of DCI.

Meanwhile, decoder 206 of terminal 200 decodes DCI, and outputs the decoding result to controller 211. Controller 211 acquires the information on the reliability, the latency requirement, or the type of use cases (or services) of the response signal from DCI.

The methods for determining "the reliability, the latency requirement, or the type of use cases (or services)" of the response signal have been described, thus far. Note that the methods of determining "the reliability, the latency requirement, or the type of use cases (or services) of the response signal" is not limited to Examples 1 to 5 described above, and the determination method may also be based on other information relating to the requirements.

(3) Further, the above embodiments have described the case where the response signal to the downlink data transmission is transmitted using PUCCH as an example. The UCI to be transmitted using PUCCH, however, is not limited to response signals in the present disclosure. For example, the "response signal (ACK/NACK or HARQ-ACK)" may be replaced with channel state information (CSI), or UCI including a response signal and CSI in the above embodiments.

(4) Further, the present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A terminal according to the present disclosure includes: circuitry, which, in operation, determines a processing mode for uplink control information or an uplink control channel to be used for transmission of the uplink control information, according to a requirement for the uplink control information; and a transmitter, which in operation, transmits the uplink control information using the uplink control channel based on the determined processing mode.

In the terminal according to an embodiment of the present disclosure, the circuitry applies a different encoding method to the uplink control information for which the requirement is different, and the transmitter multiplexes and transmits the uplink control information after encoding in the uplink control channel.

In the terminal according to an embodiment of the present disclosure, the requirement includes reliability or a latency requirement, and the uplink control information is mapped to the uplink control channel in order from the uplink control information requiring a higher level of the reliability, or in order from the uplink control information requiring lower latency for the latency requirement.

In the terminal according to an embodiment of the present disclosure, the uplink control information is mapped in order from a frequency direction to a time direction in the uplink control channel.

In the terminal according to an embodiment of the present disclosure, the uplink control information is dispersedly mapped in the frequency direction.

In the terminal according to an embodiment of the present disclosure, the uplink control information requiring the higher level of the requirement is mapped to a symbol closer to a symbol to which a reference signal is mapped.

In the terminal according to an embodiment of the present disclosure, the uplink control information requiring the lower latency for the latency requirement is mapped to an earlier symbol of the uplink control channel.

In the terminal according to an embodiment of the present disclosure, a resource set of the uplink control channel is determined based on a total number of bits of the uplink control information after encoding to be multiplexed to the uplink control channel.

In the terminal according to an embodiment of the present disclosure, a maximum coding rate is configured for each of the requirements for the uplink control information.

In the terminal according to an embodiment of the present disclosure, at least a part of the uplink control information is dropped in the uplink control channel when a coding rate of the uplink control information exceeds a predetermined threshold.

In the terminal according to an embodiment of the present disclosure, the predetermined threshold is the maximum coding rate.

In the terminal according to an embodiment of the present disclosure, the predetermined threshold is indicated from a base station to the terminal.

In the terminal according to an embodiment of the present disclosure, the uplink control information to be dropped is determined in accordance with a priority configured for each requirement.

In the terminal according to an embodiment of the present disclosure, at least a part of the uplink control information is dropped in the uplink control channel when a number of resource blocks calculated from a number of bits of the uplink control information and the maximum coding rate exceeds a predetermined threshold.

In the terminal according to an embodiment of the present disclosure, information indicating a ratio of a resource shared in the uplink control channel among the uplink control information for which the requirement is different is indicated from a base station to the terminal.

In the terminal according to an embodiment of the present disclosure, the circuitry applies a different resource determination method to the uplink control information for which the requirement is different in the uplink control channel.

In the terminal according to an embodiment of the present disclosure, a number of uplink control channels transmitting the uplink control information in a single slot is one or more, and the transmitter transmits the uplink control information for which the requirement is different using at least one of the uplink control channels different from one another in the single slot.

In the terminal according to an embodiment of the present disclosure, the circuitry respectively configures resource sets included in different groups for the uplink control information for which the requirements are different from one another.

In the terminal according to an embodiment of the present disclosure, the circuitry respectively configures resource sets included in a same group for the uplink control information for which the requirements are different from one another.

In the terminal according to an embodiment of the present disclosure, a parameter relating to the resource set is different for each of the uplink control information for which the requirement is different.

In the terminal according to an embodiment of the present disclosure, the parameter is a number of resource blocks or a sequence length of the uplink control channel.

In the terminal according to an embodiment of the present disclosure, the parameter is a number of repetitions of the uplink control information.

In the terminal according to an embodiment of the present disclosure, a slot position for transmitting the uplink control information is configured for each of the uplink control information for which the requirements are different from one another.

In the terminal according to an embodiment of the present disclosure, the circuitry drops all of or punctures a part of the uplink control channel whose priority based on the requirement is lower, when transmissions of the uplink control information for which the requirements are different from one another are at a same timing.

In the terminal according to an embodiment of the present disclosure, the uplink control information is a response signal to downlink data, a capability of the terminal relating to processing time required from reception of the downlink data to transmission of the response signal is defined for each of the requirements, timing information indicating time from reception of the downlink data to transmission of the response signal is indicated from a base station to the terminal, and the circuitry determines the processing mode based on the timing information and the capability.

A communication method according to the present disclosure includes: determining a processing mode for uplink control information or an uplink control channel to be used for transmission of the uplink control information according to a requirement for the uplink control information; and transmitting the uplink control information using the uplink control channel based on the determined processing mode.

The disclosure of Japanese Patent Application No. 2018-144982, filed on Aug. 1, 2018, including the specification, drawings, and abstract is incorporated herein by reference in its entirety.

INDUSTRIAL APPLICABILITY

One exemplary embodiment of the present disclosure is useful in mobile communication systems.

REFERENCE SIGNS LIST

100 Base station
101, 211 Controller
102 Data generator
103, 107, 110, 212 Encoder
104 Retransmission controller
105, 108, 111, 213 Modulator
106 Higher-layer control signal generator
109 Downlink control signal generator
112, 214 Signal assigner
113, 215 Inverse Fast Fourier Transformer (IFFT)
114, 216 Transmitter
115, 201 Antenna
116, 202 Receiver
117, 203 Fast Fourier Transformer (FFT)
118, 204 Extractor
119 Demodulator
120, 206, 208, 210 Decoder
121 Determiner
200 Terminal
205 Downlink control signal demodulator
207 Higher-layer control signal demodulator
209 Data demodulator

The invention claimed is:

1. A terminal, comprising:
circuitry, which, in operation, determines a first physical control channel (PUCCH) resource set for a first uplink control information with a first priority requirement and a second PUCCH resource set for a second uplink control information with a second priority requirement; and
a transmitter, which, in operation, transmits to a base station at least one of the first uplink control information and the second uplink control information in a slot,
wherein a first slot configuration used for a transmission to the base station and used for the first uplink control information with the first priority requirement is different from a second slot configuration used for a transmission to the base station and used for the second uplink control information with the second priority requirement, both of the first slot configuration and the second slot configuration including more than one slot positions, and the slot being determined based on a first information indicating the first priority requirement or the second priority requirement and on a second information indicating a slot position selected from the more than one slot positions of the first slot configuration or the second slot configuration, which are transmitted from the base station.

2. The terminal according to claim 1, wherein the first uplink control information with the first priority requirement is transmitted in a first PUCCH resource selected from the first PUCCH resource set, and the second uplink control information with the second priority requirement is transmitted in a second PUCCH resource selected from the second PUCCH resource set.

3. The terminal according to claim 1, wherein the first PUCCH resource set and the second PUCCH resource set are indicated by a higher layer signaling.

4. The terminal according to claim 2, wherein the first PUCCH resource is determined, from the first PUCCH resource set, by downlink control information (DCI).

5. The terminal according to claim 2, wherein the first PUCCH resource is selected from the first PUCCH resource set based on a total number of bits of the first uplink control information with the first priority requirement.

6. The terminal according to claim 1, wherein the second uplink control information is dropped in a case where the first uplink control information with the first priority requirement and the second uplink control information with the second priority requirement are overlapped,
wherein the first priority requirement is larger than the second priority requirement.

7. The terminal according to claim 1, wherein first information indicating the first priority requirement or the second priority requirement is indicated by downlink control information (DCI).

8. The terminal according to claim 1, wherein the first uplink control information and the second uplink control information includes a response signal and channel state information (CSI).

9. A communication method performed by a communication apparatus, comprising:
determining a first physical control channel (PUCCH) resource set for a first uplink control information with a first priority requirement and a second PUCCH resource set for a second uplink control information with a second priority requirement; and
transmitting to a base station at least one of the first uplink control information and the second uplink control information in a slot,
wherein a first slot configuration used for a transmission to the base station and used for the first uplink control information with the first priority requirement is different from a second slot configuration used for a transmission to the base station and used for the second uplink control information with the second priority requirement, both of the first slot configuration and the second slot configuration including more than one slot positions, and the slot being determined based on a first information indicating the first priority requirement or the second priority requirement and on a second information indicating a slot position selected from the more than one slot positions of the first slot configuration or the second slot configuration, which are transmitted from the base station.

10. The communication method according to claim 9, wherein the first uplink control information with the first priority requirement is transmitted in a first PUCCH resource selected from the first PUCCH resource set, and the second uplink control information with the second priority requirement is transmitted in a second PUCCH resource selected from the second PUCCH resource set.

11. The communication method according to claim 9, wherein the first PUCCH resource set and the second PUCCH resource set are indicated by a higher layer signaling.

12. The communication method according to claim 10, wherein the first PUCCH resource is determined, from the first PUCCH resource set, by downlink control information (DCI).

13. The communication method according to claim 10, wherein the first PUCCH resource is selected from the first PUCCH resource set based on a total number of bits of the first uplink control information with the first priority requirement.

14. The communication method according to claim 9, wherein the second uplink control information is dropped in a case where the first uplink control information with the first priority requirement and the second uplink control information with the second priority requirement are overlapped, wherein the first priority requirement is larger than the second priority requirement.

15. The communication method according to claim 9, wherein first information indicating the first priority requirement or the second priority requirement is indicated by the DCI.

16. The communication method according to claim 9, wherein the first uplink control information and the second uplink control information includes a response signal and channel state information (CSI).

* * * * *